(12) United States Patent
Lai et al.

(10) Patent No.: US 11,867,974 B2
(45) Date of Patent: Jan. 9, 2024

(54) OPTICAL IMAGING LENS

(71) Applicant: GENIUS ELECTRONIC OPTICAL (XIAMEN) CO., LTD., Fujian (CN)

(72) Inventors: Yongfeng Lai, Fujian (CN); Citian You, Fujian (CN); Feng Chen, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 443 days.

(21) Appl. No.: 16/884,057

(22) Filed: May 27, 2020

(65) Prior Publication Data
US 2021/0278631 A1 Sep. 9, 2021

(30) Foreign Application Priority Data
Mar. 6, 2020 (CN) .......................... 202010152160.3

(51) Int. Cl.
*G02B 9/62* (2006.01)
*G02B 7/02* (2021.01)

(52) U.S. Cl.
CPC ............... *G02B 9/62* (2013.01); *G02B 7/021* (2013.01)

(58) Field of Classification Search
CPC . G02B 7/021; G02B 9/62; G02B 9/64; G02B 13/06; G02B 13/18; G02B 13/0045; H04N 5/2254

USPC ....... 359/713, 756, 757, 759, 658, 752, 758, 359/760, 766
See application file for complete search history.

(56) References Cited

U.S. PATENT DOCUMENTS

| | | | |
|---|---|---|---|
| 2014/0063616 A1* | 3/2014 | Nihei et al. | ........ G02B 13/0045 359/713 |
| 2018/0180851 A1* | 6/2018 | Son | ........................ G02B 13/18 |

* cited by examiner

*Primary Examiner* — Travis S Fissel
(74) *Attorney, Agent, or Firm* — JCIPRNET

(57) ABSTRACT

An optical imaging lens, including first to sixth lens elements sequentially arranged from an object side to an image side along an optical axis, is provided. Each lens element includes an object-side surface facing the object side and allowing imaging rays to pass through and an image-side surface facing the image side and allowing the imaging rays to pass through. The optical imaging lens satisfies: (T3+G34)/T4≥1.900 and (HFOV×ImgH)/EFL≥50.000°, where T3 and T4 are thicknesses of the third and fourth lens elements along the optical axis, G34 is an air gap from the third lens element to the fourth lens element along the optical axis, HFOV is a half field of view of the optical imaging lens, ImgH is an image height of the optical imaging lens, and EFL is an effective focal length of the optical imaging lens.

19 Claims, 22 Drawing Sheets

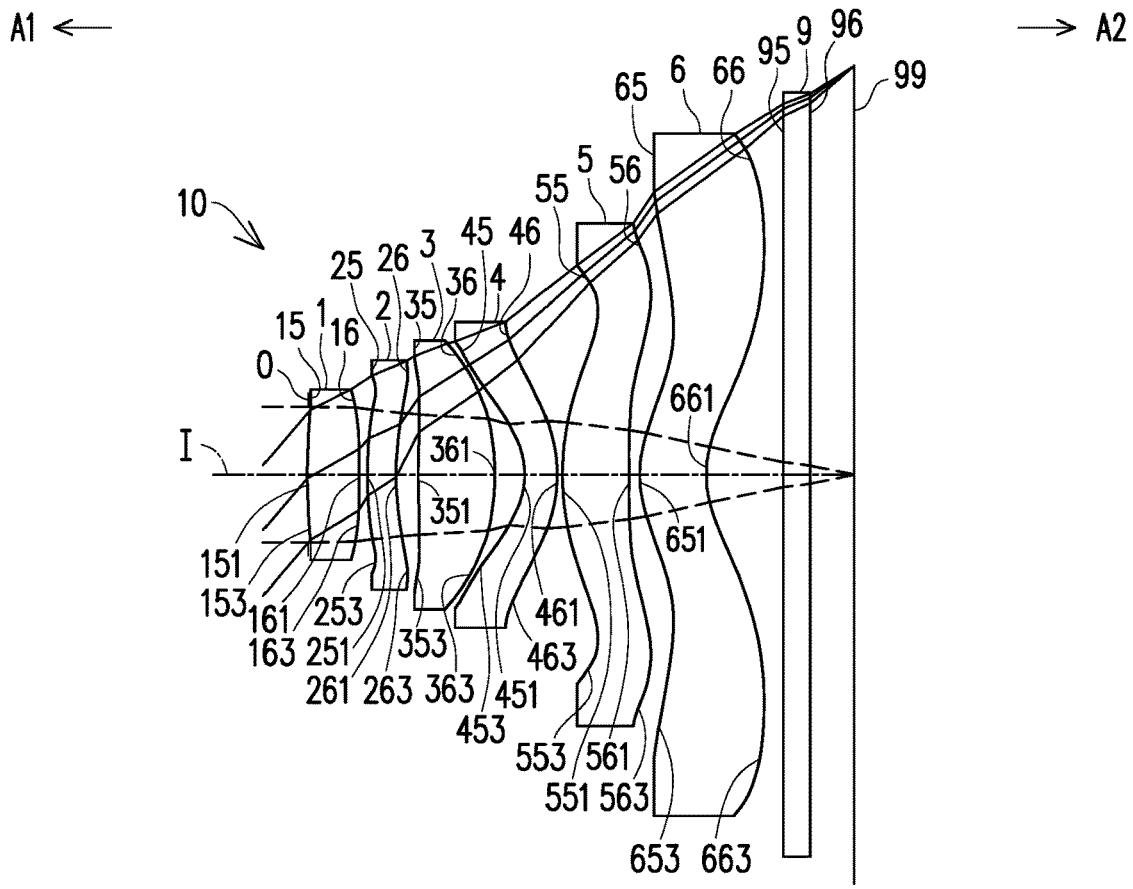
FIG. 6
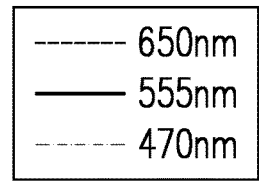
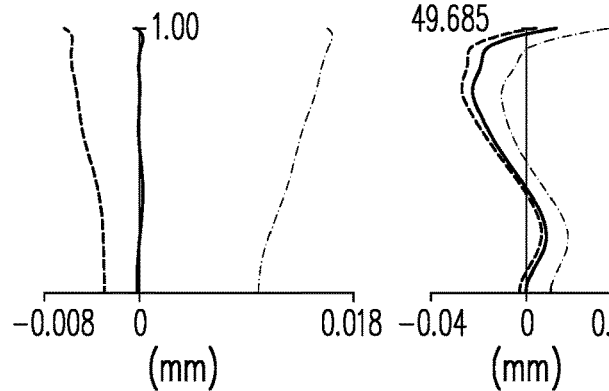
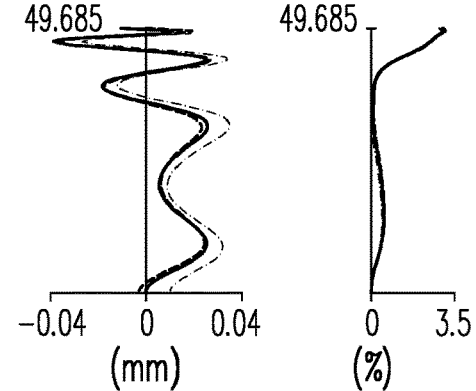
FIG. 7A    FIG. 7B    FIG. 7C    FIG. 7D

| first embodiment |||||||
|---|---|---|---|---|---|---|
| EFL=2.605 mm, HFOV=49.685°, TTL=4.250 mm, Fno=2.450, ImgH=3.180 mm |||||||
| element | surface | radius (mm) | thickness (mm) | refractive index | Abbe number | focal length (mm) |
| object | | infinity | infinity | | | |
| aperture 0 | | infinity | -0.009 | | | |
| first lens element 1 | object-side surface 15 | 4.132 | 0.409 | 1.545 | 55.987 | 4.926 |
| | image-side surface 16 | -7.446 | 0.060 | | | |
| second lens element 2 | object-side surface 25 | 2.657 | 0.223 | 1.661 | 20.373 | -15.767 |
| | image-side surface 26 | 2.050 | 0.173 | | | |
| third lens element 3 | object-side surface 35 | 9.589 | 0.597 | 1.545 | 55.987 | 3.036 |
| | image-side surface 36 | -1.961 | 0.232 | | | |
| fourth lens element 4 | object-side surface 45 | -0.594 | 0.246 | 1.661 | 20.373 | -2.201 |
| | image-side surface 46 | -1.164 | 0.043 | | | |
| fifth lens element 5 | object-side surface 55 | 2.020 | 0.520 | 1.548 | 45.781 | 3.671 |
| | image-side surface 56 | 221996.434 | 0.083 | | | |
| sixth lens element 6 | object-side surface 65 | 0.878 | 0.517 | 1.545 | 55.987 | 13.022 |
| | image-side surface 66 | 0.793 | 0.600 | | | |
| filter 9 | object-side surface 95 | infinity | 0.210 | 1.517 | 64.167 | |
| | image-side surface 96 | infinity | 0.336 | | | |
| | image plane 99 | infinity | | | | |

FIG. 8

| surface | K | $a_4$ | $a_6$ | $a_8$ | $a_{10}$ |
|---|---|---|---|---|---|
| 15 | 0.000000E+00 | -5.746246E-02 | -2.848646E-01 | 1.510841E+00 | -7.992188E+00 |
| 16 | 0.000000E+00 | -2.544246E-01 | 2.290609E-01 | 1.008751E-01 | -1.707175E+00 |
| 25 | 0.000000E+00 | -3.043802E-01 | 6.075911E-01 | -1.685986E+00 | 2.962418E+00 |
| 26 | 0.000000E+00 | -1.894957E-01 | 3.112068E-01 | -1.336504E+00 | 3.099857E+00 |
| 35 | 0.000000E+00 | -7.351862E-02 | 7.785598E-02 | -3.251068E-01 | 3.078332E-01 |
| 36 | -3.941537E+00 | -2.000462E-01 | 1.366007E-01 | -6.762845E-02 | -6.467146E-03 |
| 45 | -2.351900E+00 | -3.754036E-01 | 9.445683E-01 | -1.212246E+00 | 1.353917E+00 |
| 46 | -1.023446E+00 | -5.639331E-02 | 3.181161E-01 | -4.273241E-01 | 4.363147E-01 |
| 55 | 0.000000E+00 | -1.222045E-02 | -3.146574E-02 | 1.503275E-03 | -1.101948E-03 |
| 56 | 0.000000E+00 | 2.244830E-01 | -1.716731E-01 | 7.475608E-02 | -3.432783E-02 |
| 65 | -3.157777E+00 | -1.847907E-01 | 7.162260E-02 | -4.072071E-02 | 2.884636E-02 |
| 66 | -2.645068E+00 | -1.681162E-01 | 1.003126E-01 | -5.293457E-02 | 2.228689E-02 |
| surface | $a_{12}$ | $a_{14}$ | $a_{16}$ | $a_{18}$ | $a_{20}$ |
| 15 | 3.127431E+01 | -7.390891E+01 | 7.159769E+01 | | |
| 16 | 4.195613E+00 | -8.145630E+00 | 7.486580E+00 | | |
| 25 | -1.253744E+00 | -4.535749E+00 | 4.493046E+00 | | |
| 26 | -3.822885E+00 | 1.791942E+00 | -2.125285E-02 | | |
| 35 | -8.558296E-01 | 1.449183E+00 | -6.525782E-01 | | |
| 36 | 1.916276E-02 | -3.829404E-02 | 2.607376E-02 | | |
| 45 | -1.053688E+00 | 4.547300E-01 | -1.003418E-01 | | |
| 46 | -2.449543E-01 | 5.300412E-02 | 1.453066E-03 | | |
| 55 | -6.872103E-03 | 9.931581E-03 | -5.823039E-03 | 1.575123E-03 | -1.574994E-04 |
| 56 | 1.488674E-02 | -4.584797E-03 | 8.751173E-04 | -9.116133E-05 | 3.934135E-06 |
| 65 | -1.272255E-02 | 3.294118E-03 | -5.068451E-04 | 4.383326E-05 | -1.666633E-06 |
| 66 | -6.568880E-03 | 1.270606E-03 | -1.528478E-04 | 1.033808E-05 | -2.997683E-07 |

FIG. 9

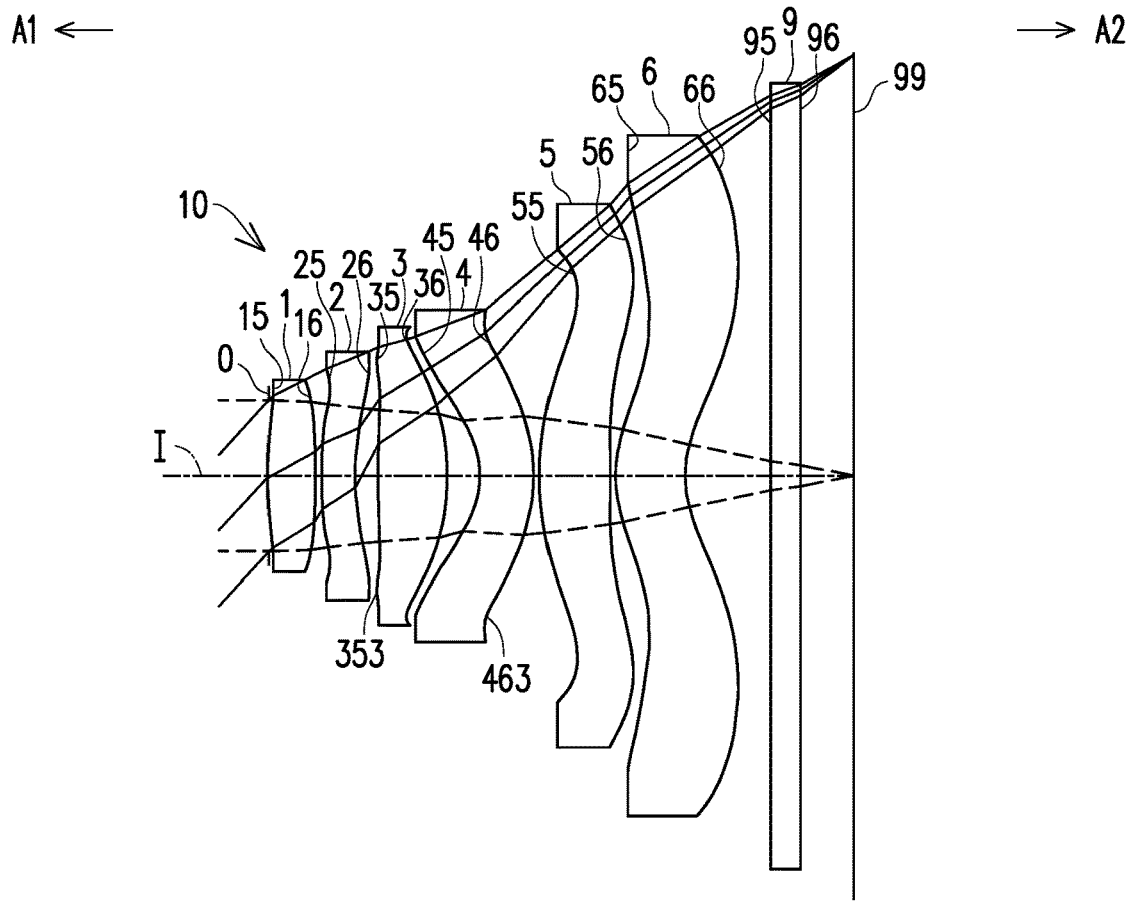
FIG. 10
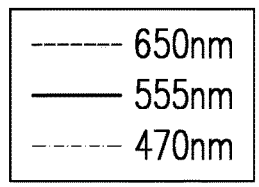
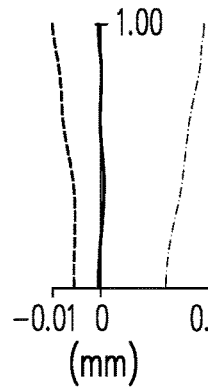
FIG. 11A
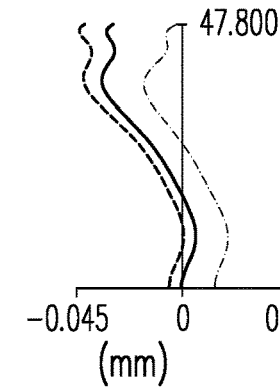
FIG. 11B
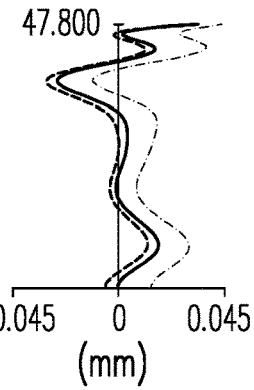
FIG. 11C
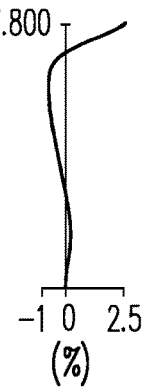
FIG. 11D

| second embodiment ||||||
|---|---|---|---|---|---|
| EFL=2.605 mm, HFOV=47.800°,TTL=4.113 mm, Fno=2.450, ImgH=2.961 mm ||||||
| element | surface | radius (mm) | thickness (mm) | refractive index | Abbe number | focal length (mm) |
| object |  | infinity | infinity |  |  |  |
| aperture 0 |  | infinity | -0.009 |  |  |  |
| first lens element 1 | object-side surface 15 | 3.099 | 0.334 | 1.545 | 55.987 | 4.465 |
|  | image-side surface 16 | -11.023 | 0.041 |  |  |  |
| second lens element 2 | object-side surface 25 | 2.665 | 0.239 | 1.661 | 20.373 | -11.631 |
|  | image-side surface 26 | 1.913 | 0.160 |  |  |  |
| third lens element 3 | object-side surface 35 | 7.030 | 0.486 | 1.545 | 55.987 | 2.590 |
|  | image-side surface 36 | -1.728 | 0.231 |  |  |  |
| fourth lens element 4 | object-side surface 45 | -0.610 | 0.377 | 1.661 | 20.373 | -2.244 |
|  | image-side surface 46 | -1.285 | 0.040 |  |  |  |
| fifth lens element 5 | object-side surface 55 | 2.172 | 0.493 | 1.545 | 55.987 | 3.978 |
|  | image-side surface 56 | 3078.630 | 0.040 |  |  |  |
| sixth lens element 6 | object-side surface 65 | 0.905 | 0.491 | 1.545 | 55.987 | 32.342 |
|  | image-side surface 66 | 0.771 | 0.600 |  |  |  |
| filter 9 | object-side surface 95 | infinity | 0.210 | 1.517 | 64.167 |  |
|  | image-side surface 96 | infinity | 0.372 |  |  |  |
|  | image plane 99 | infinity |  |  |  |  |

FIG. 12

| surface | K | $a_4$ | $a_6$ | $a_8$ | $a_{10}$ |
|---|---|---|---|---|---|
| 15 | 0.000000E+00 | -6.152140E-02 | -2.799618E-01 | 1.341434E+00 | -8.345708E+00 |
| 16 | 0.000000E+00 | -2.723518E-01 | 2.218308E-01 | -1.109410E-01 | -1.703405E+00 |
| 25 | 0.000000E+00 | -3.136270E-01 | 5.987411E-01 | -1.681301E+00 | 2.955408E+00 |
| 26 | 0.000000E+00 | -1.911813E-01 | 3.091262E-01 | -1.325805E+00 | 3.086219E+00 |
| 35 | 0.000000E+00 | -8.072387E-02 | 7.628857E-02 | -3.221132E-01 | 3.342859E-01 |
| 36 | -4.554690E+00 | -1.889934E-01 | 1.427478E-01 | -5.821665E-02 | -1.221179E-03 |
| 45 | -2.622855E+00 | -3.551839E-01 | 9.573752E-01 | -1.210018E+00 | 1.353788E+00 |
| 46 | -1.027334E+00 | -5.606456E-02 | 3.167233E-01 | -4.282868E-01 | 4.361520E-01 |
| 55 | 0.000000E+00 | -3.006799E-04 | -3.242270E-02 | 1.671636E-03 | -9.523583E-04 |
| 56 | 0.000000E+00 | 2.237481E-01 | -1.717028E-01 | 7.470016E-02 | -3.434025E-02 |
| 65 | -3.538888E+00 | -1.830762E-01 | 7.165972E-02 | -4.072248E-02 | 2.884455E-02 |
| 66 | -3.040665E+00 | -1.715880E-01 | 1.002962E-01 | -5.295936E-02 | 2.228358E-02 |
| surface | $a_{12}$ | $a_{14}$ | $a_{16}$ | $a_{18}$ | $a_{20}$ |
| 15 | 3.146687E+01 | -6.671823E+01 | 5.668495E+01 | | |
| 16 | 4.989585E+00 | -8.591715E+00 | 5.837724E+00 | | |
| 25 | -1.319944E+00 | -4.491789E+00 | 4.363856E+00 | | |
| 26 | -3.854935E+00 | 1.787430E+00 | -1.609174E-02 | | |
| 35 | -7.992529E-01 | 1.483246E+00 | -7.275875E-01 | | |
| 36 | 1.710618E-02 | -2.915282E-02 | 6.710295E-02 | | |
| 45 | -1.058579E+00 | 4.482882E-01 | -1.049417E-01 | | |
| 46 | -2.445890E-01 | 5.389278E-02 | 1.350745E-03 | | |
| 55 | -6.856183E-03 | 9.933355E-03 | -5.827414E-03 | 1.573626E-03 | -1.582555E-04 |
| 56 | 1.488556E-02 | -4.585206E-03 | 8.750073E-04 | -9.117785E-05 | 3.932090E-06 |
| 65 | -1.272273E-02 | 3.294150E-03 | -5.068379E-04 | 4.383316E-05 | -1.667051E-06 |
| 66 | -6.569062E-03 | 1.270585E-03 | -1.528518E-04 | 1.033771E-05 | -2.997304E-07 |

FIG. 13

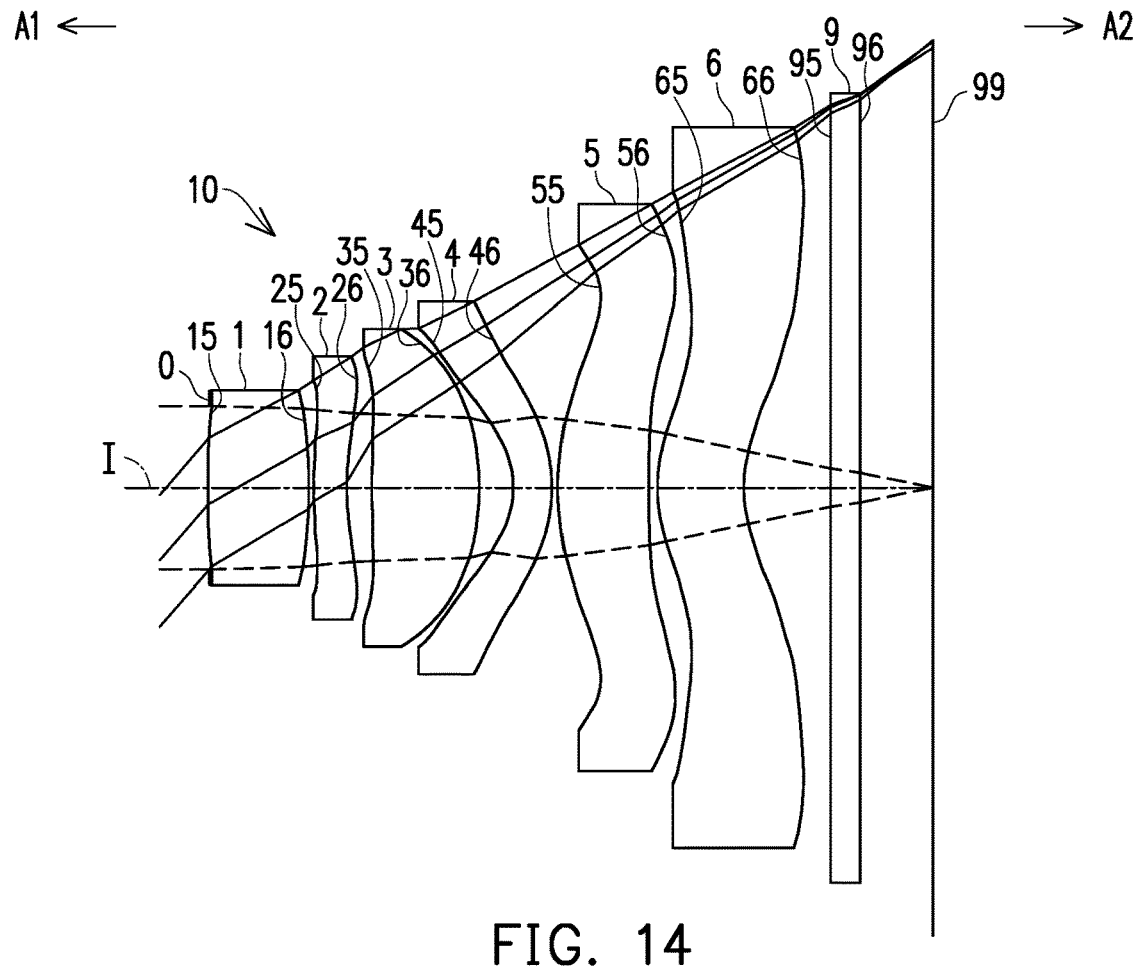
FIG. 14
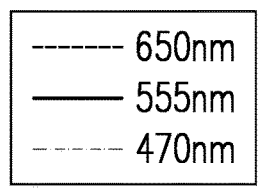
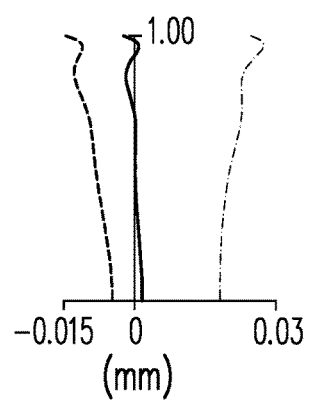
longitudinal spherical aberration
field of view
FIG. 15A
field curvature (sagittal direction)
HFOV (°)
FIG. 15B
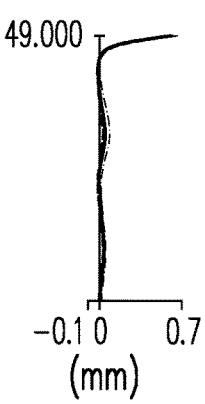
field curvature (tangential direction)
HFOV (°)
FIG. 15C
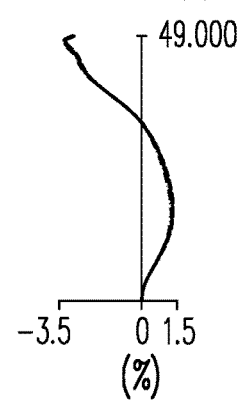
distortion
HFOV (°)
FIG. 15D

| third embodiment |||||||
|---|---|---|---|---|---|---|
| EFL=2.770 mm, HFOV=49.000°, TTL=5.057 mm, Fno=2.450, ImgH=3.104 mm |||||||
| element | surface | radius (mm) | thickness (mm) | refractive index | Abbe number | focal length (mm) |
| object | | infinity | infinity | | | |
| aperture 0 | | infinity | -0.009 | | | |
| first lens element 1 | object-side surface 15 | 7.098 | 0.696 | 1.545 | 55.987 | 6.268 |
| | image-side surface 16 | -6.386 | 0.038 | | | |
| second lens element 2 | object-side surface 25 | 3.040 | 0.234 | 1.661 | 20.373 | -12.924 |
| | image-side surface 26 | 2.178 | 0.173 | | | |
| third lens element 3 | object-side surface 35 | 8.794 | 0.749 | 1.545 | 55.987 | 3.072 |
| | image-side surface 36 | -2.011 | 0.242 | | | |
| fourth lens element 4 | object-side surface 45 | -0.591 | 0.269 | 1.661 | 20.373 | -2.476 |
| | image-side surface 46 | -1.088 | 0.041 | | | |
| fifth lens element 5 | object-side surface 55 | 2.103 | 0.636 | 1.545 | 55.987 | 3.849 |
| | image-side surface 56 | 1541294334.877 | 0.057 | | | |
| sixth lens element 6 | object-side surface 65 | 1.004 | 0.605 | 1.545 | 55.987 | 11.984 |
| | image-side surface 66 | 0.933 | 0.600 | | | |
| filter 9 | object-side surface 95 | infinity | 0.210 | 1.517 | 64.167 | |
| | image-side surface 96 | infinity | 0.507 | | | |
| | image plane 99 | infinity | | | | |

FIG. 16

| surface | K | $a_4$ | $a_6$ | $a_8$ | $a_{10}$ |
|---|---|---|---|---|---|
| 15 | 0.000000E+00 | -3.705699E-03 | -2.514009E-01 | 1.538345E+00 | -7.673510E+00 |
| 16 | 0.000000E+00 | -2.092233E-01 | 2.195114E-01 | 6.292028E-02 | -1.545777E+00 |
| 25 | 0.000000E+00 | -3.385712E-01 | 5.149238E-01 | -1.733336E+00 | 3.020624E+00 |
| 26 | 0.000000E+00 | -2.072993E-01 | 2.641675E-01 | -1.353796E+00 | 3.106325E+00 |
| 35 | 0.000000E+00 | -8.393996E-02 | 6.129430E-02 | -3.329709E-01 | 2.910226E-01 |
| 36 | -3.894482E+00 | -2.155921E-01 | 1.062117E-01 | -8.048284E-02 | -4.535671E-03 |
| 45 | -2.171775E+00 | -3.879630E-01 | 9.301779E-01 | -1.221638E+00 | 1.352512E+00 |
| 46 | -9.229441E-01 | -6.641018E-02 | 3.198759E-01 | -4.251404E-01 | 4.376206E-01 |
| 55 | 0.000000E+00 | 1.648368E-03 | -3.175875E-02 | 1.937989E-03 | -9.020989E-04 |
| 56 | 0.000000E+00 | 2.274195E-01 | -1.713928E-01 | 7.474273E-02 | -3.434340E-02 |
| 65 | -3.110155E+00 | -1.819903E-01 | 7.166058E-02 | -4.069919E-02 | 2.884588E-02 |
| 66 | -2.837159E+00 | -1.643152E-01 | 1.006714E-01 | -5.295575E-02 | 2.228117E-02 |
| surface | $a_{12}$ | $a_{14}$ | $a_{16}$ | $a_{18}$ | $a_{20}$ |
| 15 | 3.119529E+01 | -7.536107E+01 | 7.363385E+01 | | |
| 16 | 4.521916E+00 | -7.756108E+00 | 5.619501E+00 | | |
| 25 | -1.130277E+00 | -4.647979E+00 | 3.713691E+00 | | |
| 26 | -3.780074E+00 | 1.819382E+00 | -7.243804E-02 | | |
| 35 | -8.461548E-01 | 1.460748E+00 | -6.656336E-01 | | |
| 36 | 2.473870E-02 | -3.713928E-02 | 2.028528E-02 | | |
| 45 | -1.049829E+00 | 4.594506E-01 | -9.670266E-02 | | |
| 46 | -2.454928E-01 | 5.209061E-02 | 3.322511E-05 | | |
| 55 | -6.842037E-03 | 9.932999E-03 | -5.826543E-03 | 1.573304E-03 | -1.584972E-04 |
| 56 | 1.488368E-02 | -4.585906E-03 | 8.748783E-04 | -9.120932E-05 | 3.921355E-06 |
| 65 | -1.272366E-02 | 3.293962E-03 | -5.069441E-04 | 4.380163E-05 | -1.674503E-06 |
| 66 | -6.569330E-03 | 1.270573E-03 | -1.528477E-04 | 1.033900E-05 | -2.995215E-07 |

FIG. 17

| fourth embodiment |||||||
|---|---|---|---|---|---|---|
| EFL=2.709 mm, HFOV=50.916°, TTL=4.293 mm, Fno=2.450, ImgH=3.321 mm |||||||
| element | surface | radius (mm) | thickness (mm) | refractive index | Abbe number | focal length (mm) |
| object | | infinity | infinity | | | |
| aperture 0 | | infinity | -0.009 | | | |
| first lens element 1 | object-side surface 15 | 4.356 | 0.330 | 1.545 | 55.987 | 5.203 |
| | image-side surface 16 | -7.960 | 0.040 | | | |
| second lens element 2 | object-side surface 25 | 3.211 | 0.295 | 1.661 | 20.373 | -15.500 |
| | image-side surface 26 | 2.360 | 0.168 | | | |
| third lens element 3 | object-side surface 35 | 11.224 | 0.770 | 1.545 | 55.987 | 2.691 |
| | image-side surface 36 | -1.651 | 0.181 | | | |
| fourth lens element 4 | object-side surface 45 | -0.620 | 0.283 | 1.661 | 20.373 | -2.623 |
| | image-side surface 46 | -1.136 | 0.084 | | | |
| fifth lens element 5 | object-side surface 55 | 1.978 | 0.338 | 1.545 | 55.987 | 4.006 |
| | image-side surface 56 | 19.347 | 0.078 | | | |
| sixth lens element 6 | object-side surface 65 | 0.828 | 0.384 | 1.545 | 55.987 | -64.335 |
| | image-side surface 66 | 0.676 | 0.600 | | | |
| filter 9 | object-side surface 95 | infinity | 0.210 | 1.517 | 64.167 | |
| | image-side surface 96 | infinity | 0.533 | | | |
| | image plane 99 | infinity | | | | |

FIG. 20

| surface | K | $a_4$ | $a_6$ | $a_8$ | $a_{10}$ |
|---|---|---|---|---|---|
| 15 | 0.000000E+00 | -5.149439E-02 | -2.992965E-01 | 1.748599E+00 | -8.411554E+00 |
| 16 | 0.000000E+00 | -2.310240E-01 | 2.835145E-01 | 1.738176E-02 | -2.411377E+00 |
| 25 | 0.000000E+00 | -2.654186E-01 | 6.077926E-01 | -1.673838E+00 | 2.781402E+00 |
| 26 | 0.000000E+00 | -1.823516E-01 | 3.106713E-01 | -1.356887E+00 | 3.049182E+00 |
| 35 | 0.000000E+00 | -8.758490E-02 | 2.416190E-02 | -2.876850E-01 | 3.497268E-01 |
| 36 | -3.936977E+00 | -2.054466E-01 | 1.414051E-01 | -8.325086E-02 | -1.900183E-02 |
| 45 | -2.709285E+00 | -3.670397E-01 | 9.350772E-01 | -1.232872E+00 | 1.338319E+00 |
| 46 | -1.060037E+00 | -4.831620E-02 | 3.219402E-01 | -4.250353E-01 | 4.376333E-01 |
| 55 | 0.000000E+00 | -1.975987E-02 | -3.206252E-02 | 1.665267E-03 | -9.401652E-04 |
| 56 | 0.000000E+00 | 2.201681E-01 | -1.727743E-01 | 7.460850E-02 | -3.433543E-02 |
| 65 | -3.491990E+00 | -1.887829E-01 | 7.160825E-02 | -4.071369E-02 | 2.884632E-02 |
| 66 | -2.532697E+00 | -1.704852E-01 | 9.985550E-02 | -5.298422E-02 | 2.228576E-02 |
| surface | $a_{12}$ | $a_{14}$ | $a_{16}$ | $a_{18}$ | $a_{20}$ |
| 15 | 2.771790E+01 | -5.852943E+01 | 5.413751E+01 | | |
| 16 | 6.557996E+00 | -1.163899E+01 | 1.003459E+01 | | |
| 25 | -1.575283E+00 | -3.937429E+00 | 4.729590E+00 | | |
| 26 | -3.749473E+00 | 1.824662E+00 | 3.722560E-02 | | |
| 35 | -8.330462E-01 | 1.436902E+00 | -6.631918E-01 | | |
| 36 | 1.860013E-02 | -4.888898E-02 | 3.442767E-02 | | |
| 45 | -1.053030E+00 | 4.633655E-01 | -9.460434E-02 | | |
| 46 | -2.444940E-01 | 5.250714E-02 | 2.214929E-04 | | |
| 55 | -6.883987E-03 | 9.934671E-03 | -5.826400E-03 | 1.573158E-03 | -1.582601E-04 |
| 56 | 1.488890E-02 | -4.584475E-03 | 8.751558E-04 | -9.119181E-05 | 3.913829E-06 |
| 65 | -1.272182E-02 | 3.294152E-03 | -5.068661E-04 | 4.383436E-05 | -1.670033E-06 |
| 66 | -6.568414E-03 | 1.270641E-03 | -1.528495E-04 | 1.033754E-05 | -2.999318E-07 |

FIG. 21

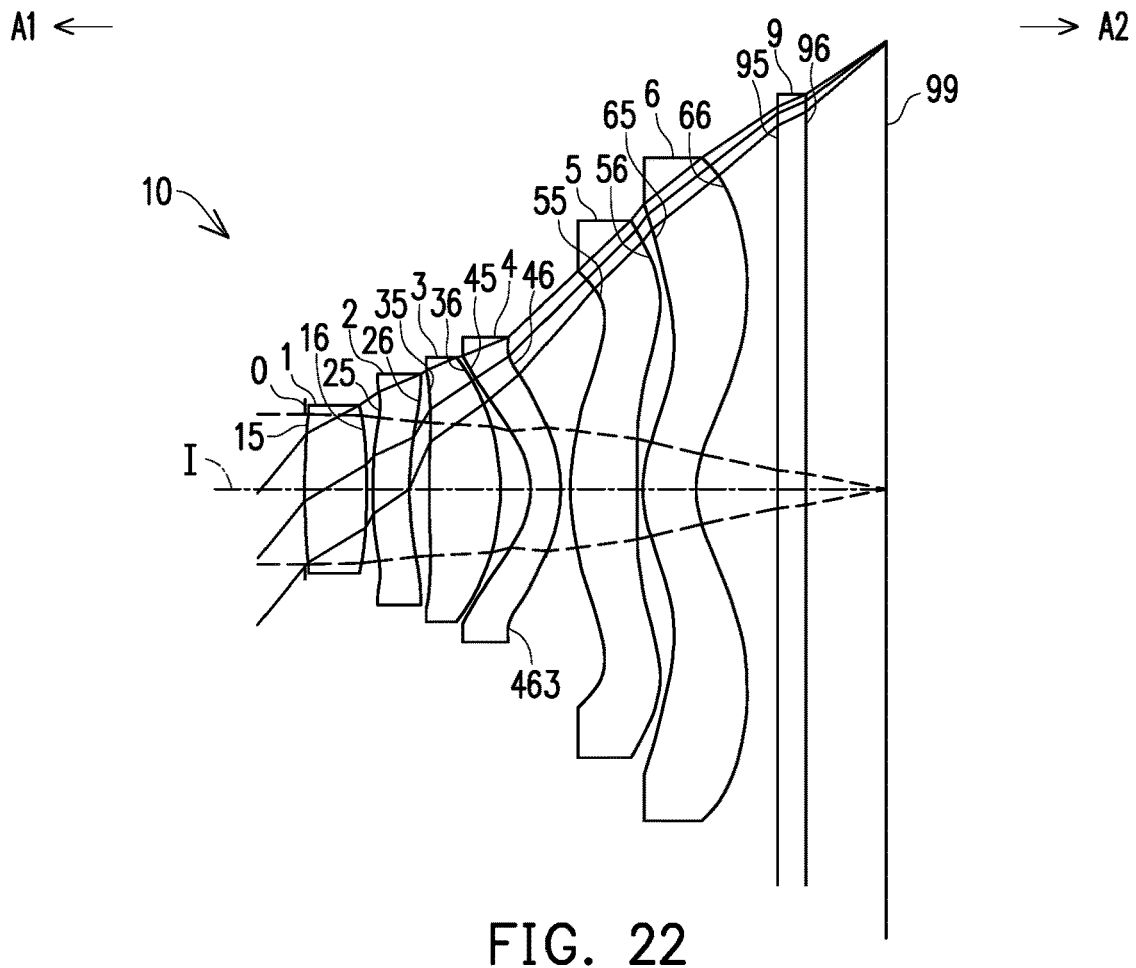
FIG. 22
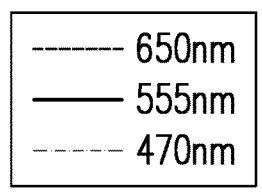
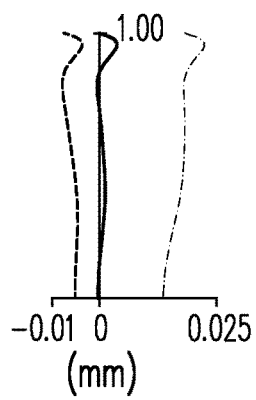
longitudinal spherical aberration
field of view
FIG. 23A
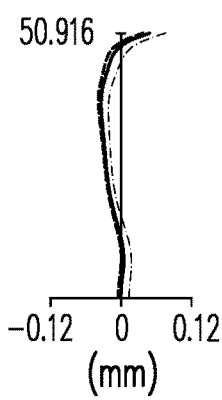
field curvature
(sagittal direction)
HFOV (°)
FIG. 23B
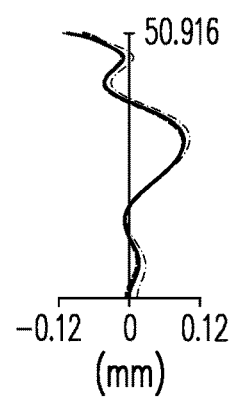
field curvature
(tangential direction)
HFOV (°)
FIG. 23C
distortion
HFOV (°)
FIG. 23D

| fifth embodiment |||||||
|---|---|---|---|---|---|---|
| EFL=2.757 mm, HFOV=50.916°, TTL=4.301 mm, Fno=2.450, ImgH=3.321 mm |||||||
| element | surface | radius (mm) | thickness (mm) | refractive index | Abbe number | focal length (mm) |
| object | | infinity | infinity | | | |
| aperture 0 | | infinity | -0.009 | | | |
| first lens element 1 | object-side surface 15 | 4.491 | 0.462 | 1.545 | 55.987 | 5.124 |
| | image-side surface 16 | -7.158 | 0.045 | | | |
| second lens element 2 | object-side surface 25 | 2.979 | 0.271 | 1.661 | 20.373 | -13.819 |
| | image-side surface 26 | 2.169 | 0.150 | | | |
| third lens element 3 | object-side surface 35 | 12.860 | 0.524 | 1.545 | 55.987 | 2.912 |
| | image-side surface 36 | -1.789 | 0.223 | | | |
| fourth lens element 4 | object-side surface 45 | -0.599 | 0.221 | 1.661 | 20.373 | -2.475 |
| | image-side surface 46 | -1.079 | 0.075 | | | |
| fifth lens element 5 | object-side surface 55 | 2.167 | 0.489 | 1.545 | 55.987 | 3.985 |
| | image-side surface 56 | 439.078 | 0.040 | | | |
| sixth lens element 6 | object-side surface 65 | 0.864 | 0.400 | 1.545 | 55.987 | 28.296 |
| | image-side surface 66 | 0.766 | 0.600 | | | |
| filter 9 | object-side surface 95 | infinity | 0.210 | 1.517 | 64.167 | |
| | image-side surface 96 | infinity | 0.591 | | | |
| | image plane 99 | infinity | | | | |

FIG. 24

| surface | K | $a_4$ | $a_6$ | $a_8$ | $a_{10}$ |
|---|---|---|---|---|---|
| 15 | 0.000000E+00 | -3.133331E-02 | -3.342467E-01 | 1.636812E+00 | -7.585955E+00 |
| 16 | 0.000000E+00 | -2.422549E-01 | 2.267155E-01 | 3.130968E-01 | -1.565784E+00 |
| 25 | 0.000000E+00 | -3.074100E-01 | 6.375860E-01 | -1.632222E+00 | 3.002507E+00 |
| 26 | 0.000000E+00 | -1.808633E-01 | 3.137920E-01 | -1.329818E+00 | 3.104440E+00 |
| 35 | 0.000000E+00 | -6.146793E-02 | 1.012072E-01 | -3.307434E-01 | 2.879432E-01 |
| 36 | -5.243016E+00 | -1.893390E-01 | 1.393561E-01 | -7.641416E-02 | -1.503532E-02 |
| 45 | -2.500326E+00 | -3.865623E-01 | 9.421444E-01 | -1.203978E+00 | 1.361720E+00 |
| 46 | -1.111251E+00 | -4.921343E-02 | 3.235997E-01 | -4.268648E-01 | 4.358569E-01 |
| 55 | 0.000000E+00 | -7.813976E-03 | -3.134618E-02 | 1.403483E-03 | -1.135645E-03 |
| 56 | 0.000000E+00 | 2.248028E-01 | -1.717586E-01 | 7.469537E-02 | -3.434173E-02 |
| 65 | -3.743812E+00 | -1.848650E-01 | 7.157366E-02 | -4.072439E-02 | 2.884679E-02 |
| 66 | -3.010606E+00 | -1.726786E-01 | 1.006674E-01 | -5.295158E-02 | 2.228061E-02 |
| surface | $a_{12}$ | $a_{14}$ | $a_{16}$ | $a_{18}$ | $a_{20}$ |
| 15 | 3.051457E+01 | -7.556483E+01 | 7.475408E+01 | | |
| 16 | 3.730449E+00 | -9.225340E+00 | 8.892793E+00 | | |
| 25 | -1.402071E+00 | -4.598562E+00 | 4.504147E+00 | | |
| 26 | -3.807246E+00 | 1.799066E+00 | -6.146067E-02 | | |
| 35 | -8.562023E-01 | 1.467393E+00 | -6.429920E-01 | | |
| 36 | 1.165459E-02 | -3.347270E-02 | 4.521961E-02 | | |
| 45 | -1.051710E+00 | 4.543059E-01 | -1.108159E-01 | | |
| 46 | -2.448432E-01 | 5.367918E-02 | 2.378910E-03 | | |
| 55 | -6.903183E-03 | 9.931899E-03 | -5.822494E-03 | 1.575422E-03 | -1.576964E-04 |
| 56 | 1.488449E-02 | -4.585460E-03 | 8.749391E-04 | -9.120389E-05 | 3.922529E-06 |
| 65 | -1.272267E-02 | 3.294070E-03 | -5.068444E-04 | 4.382685E-05 | -1.668087E-06 |
| 66 | -6.569488E-03 | 1.270541E-03 | -1.528528E-04 | 1.033813E-05 | -2.996507E-07 |

FIG. 25

| sixth embodiment | | | | | | |
|---|---|---|---|---|---|---|
| EFL=2.768 mm, HFOV=49.000°, TTL=5.210 mm, Fno=2.450, ImgH=3.103 mm | | | | | | |
| element | surface | radius (mm) | thickness (mm) | refractive index | Abbe number | focal length (mm) |
| object | | infinity | infinity | | | |
| aperture 0 | | infinity | -0.009 | | | |
| first lens element 1 | object-side surface 15 | 7.283 | 0.851 | 1.545 | 55.987 | 6.467 |
| | image-side surface 16 | -6.578 | 0.036 | | | |
| second lens element 2 | object-side surface 25 | 3.508 | 0.296 | 1.661 | 20.373 | -11.267 |
| | image-side surface 26 | 2.311 | 0.165 | | | |
| third lens element 3 | object-side surface 35 | 5.947 | 0.728 | 1.545 | 55.987 | 2.959 |
| | image-side surface 36 | -2.124 | 0.244 | | | |
| fourth lens element 4 | object-side surface 45 | -0.588 | 0.288 | 1.661 | 20.373 | -2.564 |
| | image-side surface 46 | -1.072 | 0.040 | | | |
| fifth lens element 5 | object-side surface 55 | 2.076 | 0.628 | 1.545 | 55.987 | 3.997 |
| | image-side surface 56 | 37.598 | 0.040 | | | |
| sixth lens element 6 | object-side surface 65 | 0.979 | 0.627 | 1.545 | 55.987 | 12.587 |
| | image-side surface 66 | 0.883 | 0.600 | | | |
| filter 9 | object-side surface 95 | infinity | 0.210 | 1.517 | 64.167 | |
| | image-side surface 96 | infinity | 0.458 | | | |
| | image plane 99 | infinity | | | | |

FIG. 28

| surface | K | $a_4$ | $a_6$ | $a_8$ | $a_{10}$ |
|---|---|---|---|---|---|
| 15 | 0.000000E+00 | 1.046312E-02 | -2.451374E-01 | 1.542315E+00 | -7.601870E+00 |
| 16 | 0.000000E+00 | -2.146964E-01 | 2.197330E-01 | 1.588255E-01 | -1.561469E+00 |
| 25 | 0.000000E+00 | -3.482808E-01 | 5.244689E-01 | -1.743321E+00 | 3.027303E+00 |
| 26 | 0.000000E+00 | -2.038970E-01 | 2.527323E-01 | -1.342427E+00 | 3.122736E+00 |
| 35 | 0.000000E+00 | -9.832544E-02 | 6.931409E-02 | -3.319232E-01 | 2.939453E-01 |
| 36 | -3.858695E+00 | -2.160308E-01 | 1.038336E-01 | -8.550635E-02 | -5.063229E-03 |
| 45 | -2.240828E+00 | -3.912098E-01 | 9.326027E-01 | -1.221906E+00 | 1.351429E+00 |
| 46 | -9.540793E-01 | -6.275554E-02 | 3.203456E-01 | -4.253861E-01 | 4.369053E-01 |
| 55 | 0.000000E+00 | 1.057838E-03 | -3.145839E-02 | 1.588520E-03 | -9.788129E-04 |
| 56 | 0.000000E+00 | 2.261351E-01 | -1.715925E-01 | 7.471446E-02 | -3.433999E-02 |
| 65 | -3.168407E+00 | -1.829661E-01 | 7.167056E-02 | -4.071367E-02 | 2.884567E-02 |
| 66 | -3.362425E+00 | -1.641077E-01 | 1.005210E-01 | -5.297534E-02 | 2.227999E-02 |
| surface | $a_{12}$ | $a_{14}$ | $a_{16}$ | $a_{18}$ | $a_{20}$ |
| 15 | 3.089430E+01 | -7.542962E+01 | 7.387637E+01 | | |
| 16 | 3.878260E+00 | -8.177587E+00 | 6.549149E+00 | | |
| 25 | -1.171407E+00 | -4.853102E+00 | 2.772311E+00 | | |
| 26 | -3.787932E+00 | 1.807596E+00 | -5.276194E-02 | | |
| 35 | -8.556922E-01 | 1.448226E+00 | -6.528016E-01 | | |
| 36 | 2.374290E-02 | -3.687296E-02 | 2.229376E-02 | | |
| 45 | -1.052722E+00 | 4.586415E-01 | -9.442582E-02 | | |
| 46 | -2.454657E-01 | 5.201460E-02 | 1.917544E-04 | | |
| 55 | -6.865370E-03 | 9.929355E-03 | -5.826460E-03 | 1.573763E-03 | -1.581806E-04 |
| 56 | 1.488581E-02 | -4.585095E-03 | 8.750695E-04 | -9.117464E-05 | 3.929029E-06 |
| 65 | -1.272276E-02 | 3.294147E-03 | -5.068481E-04 | 4.383427E-05 | -1.665922E-06 |
| 66 | -6.569345E-03 | 1.270578E-03 | -1.528453E-04 | 1.033923E-05 | -2.995120E-07 |

FIG. 29

| conditional expression | first embodiment | second embodiment | third embodiment | fourth embodiment | fifth embodiment | sixth embodiment |
|---|---|---|---|---|---|---|
| T1 | 0.409 | 0.334 | 0.696 | 0.330 | 0.462 | 0.851 |
| G12 | 0.060 | 0.041 | 0.038 | 0.040 | 0.045 | 0.036 |
| T2 | 0.223 | 0.239 | 0.234 | 0.295 | 0.271 | 0.296 |
| G23 | 0.173 | 0.160 | 0.173 | 0.168 | 0.150 | 0.165 |
| T3 | 0.597 | 0.486 | 0.749 | 0.770 | 0.524 | 0.728 |
| G34 | 0.232 | 0.231 | 0.242 | 0.181 | 0.223 | 0.244 |
| T4 | 0.246 | 0.377 | 0.269 | 0.283 | 0.221 | 0.288 |
| G45 | 0.043 | 0.040 | 0.041 | 0.084 | 0.075 | 0.040 |
| T5 | 0.520 | 0.493 | 0.636 | 0.338 | 0.489 | 0.628 |
| G56 | 0.083 | 0.040 | 0.057 | 0.078 | 0.040 | 0.040 |
| T6 | 0.517 | 0.491 | 0.605 | 0.384 | 0.400 | 0.627 |
| G6F | 0.600 | 0.600 | 0.600 | 0.600 | 0.600 | 0.600 |
| TF | 0.210 | 0.210 | 0.210 | 0.210 | 0.210 | 0.210 |
| GFP | 0.336 | 0.372 | 0.507 | 0.533 | 0.591 | 0.458 |
| BFL | 1.146 | 1.182 | 1.317 | 1.343 | 1.401 | 1.268 |
| EFL | 2.605 | 2.605 | 2.770 | 2.709 | 2.757 | 2.768 |
| TTL | 4.250 | 4.113 | 5.057 | 4.293 | 4.301 | 5.210 |
| TL | 3.103 | 2.932 | 3.740 | 2.950 | 2.901 | 3.942 |
| ALT | 2.511 | 2.420 | 3.189 | 2.400 | 2.367 | 3.418 |
| AAG | 0.592 | 0.512 | 0.551 | 0.551 | 0.533 | 0.524 |
| ImgH | 3.180 | 2.961 | 3.104 | 3.321 | 3.321 | 3.103 |
| HFOV | 49.685 | 47.800 | 49.000 | 50.916 | 50.916 | 49.000 |

FIG. 30

| conditional expression | first embodiment | second embodiment | third embodiment | fourth embodiment | fifth embodiment | sixth embodiment |
|---|---|---|---|---|---|---|
| (T3+G34)/AAG | 1.400 | 1.400 | 1.798 | 1.726 | 1.400 | 1.854 |
| (T3+G34)/T4 | 3.369 | 1.900 | 3.682 | 3.360 | 3.376 | 3.371 |
| (HFOV×ImgH)/EFL | 60.652 | 54.332 | 54.908 | 62.419 | 61.332 | 54.930 |
| V5 | 45.781 | 55.987 | 55.987 | 55.987 | 55.987 | 55.987 |
| ALT/(T4+G56) | 7.622 | 5.800 | 9.771 | 6.643 | 9.066 | 10.415 |
| (T6+ImgH)/AAG | 6.243 | 6.745 | 6.731 | 6.727 | 6.976 | 7.116 |
| HFOV/(EFL+TTL) | 7.248 | 7.115 | 6.260 | 7.271 | 7.214 | 6.142 |
| BFL/T6 | 2.218 | 2.408 | 2.176 | 3.500 | 3.500 | 2.024 |
| TL/(G45+T5+G56) | 4.800 | 5.117 | 5.096 | 5.894 | 4.800 | 5.567 |
| (T1+T3)/(G23+G34) | 2.480 | 2.100 | 3.479 | 3.151 | 2.641 | 3.868 |
| (G12+T2+G45+T5)/T6 | 1.638 | 1.657 | 1.566 | 1.973 | 2.200 | 1.596 |
| (T2+AAG)/T5 | 1.568 | 1.524 | 1.235 | 2.500 | 1.645 | 1.306 |
| TL/(T1+G34+T6) | 2.681 | 2.778 | 2.423 | 3.300 | 2.674 | 2.291 |
| EFL/(T3+T4) | 3.091 | 3.018 | 2.722 | 2.574 | 3.700 | 2.724 |
| TTL/ImgH | 1.336 | 1.389 | 1.629 | 1.293 | 1.295 | 1.679 |
| (T2+T4)/G34 | 2.021 | 2.674 | 2.078 | 3.200 | 2.209 | 2.399 |
| ALT/(G34+G45+G56) | 7.000 | 7.790 | 9.370 | 7.000 | 7.000 | 10.566 |
| EFL/(G34+T6) | 3.478 | 3.612 | 3.268 | 4.800 | 4.425 | 3.180 |
| (T1+T4+G45)/T2 | 3.126 | 3.140 | 4.300 | 2.358 | 2.797 | 3.981 |
| (G56+BFL)/T5 | 2.365 | 2.479 | 2.163 | 4.200 | 2.946 | 2.083 |
| (T4+T5+T6)/T3 | 2.150 | 2.800 | 2.017 | 1.306 | 2.119 | 2.120 |

FIG. 31

OPTICAL IMAGING LENS

CROSS-REFERENCE TO RELATED APPLICATION

This application claims the priority benefit of China application serial no. 202010152160.3, filed on Mar. 6, 2020. The entirety of the above-mentioned patent application is hereby incorporated by reference herein and made a part of this specification.

BACKGROUND

Technical Field

The disclosure relates to an optical element, and in particular to an optical imaging lens.

Description of Related Art

In recent years, optical imaging lenses have continued to evolve. In addition to having an excellent imaging quality, conventional portable electronic devices have begun to pursue the full-screen design. Therefore, the design of the ratio of the area occupied by the optical imaging lens to the screen area also needs to be getting smaller. However, in order to have a wider field of view, conventional optical imaging lenses are designed to occupy a larger area of the screens of portable electronic devices, making it difficult to satisfy consumer demand. Therefore, how to maintain a wider field of view while having a smaller front surface area of the lens has become a design development target. In addition, increasing the distance from an object-side surface of a first lens element to an image plane along an optical axis is not conducive to the thinning of handphones and digital cameras. Therefore, providing an optical imaging lens that is thin, short, small, and has a good imaging quality is also a necessary design target.

SUMMARY

The disclosure provides an optical imaging lens, which can maintain a good imaging quality and provide a smaller front surface area of the lens under the case where the system length is shortened.

An embodiment of the present disclosure provides an optical imaging lens, which includes a first lens element, a second lens element, a third lens element, a fourth lens element, a fifth lens element, and a sixth lens element sequentially arranged from an object side to an image side along the optical axis. Each of the first lens element to the sixth lens element includes an object-side surface facing the object side and allowing imaging rays to pass through and an image-side surface facing the image side and allowing the imaging rays to pass through. An optical axis region of the image-side surface of the first lens element is convex. The second lens element has a negative refracting power. The fourth lens element has a negative refracting power. An optical axis region of the image-side surface of the fifth lens element is concave. The lens elements of the optical imaging lens only include the first lens element to the sixth lens element and satisfy the following conditional expressions: $(T3+G34)/T4 \geq 1.900$ and $(HFOV \times ImgH)/EFL \geq 50.000°$, where T3 is a thickness of the third lens element along the optical axis, T4 is a thickness of the fourth lens element along the optical axis, G34 is an air gap from the third lens element to the fourth lens element along the optical axis, HFOV is a half field of view of the optical imaging lens, ImgH is an image height of the optical imaging lens, and EFL is an effective focal length of the optical imaging lens.

An embodiment of the present disclosure provides an optical imaging lens, which includes a first lens element, a second lens element, a third lens element, a fourth lens element, a fifth lens element, and a sixth lens element sequentially arranged from an object side to an image side along an optical axis. Each of the first lens element to the sixth lens element includes an object-side surface facing the object side and allowing imaging rays to pass through and an image-side surface facing the image side and allowing the imaging rays to pass through. An optical axis region of the image-side surface of the first lens element is convex. The second lens element has a negative refracting power. The fourth lens element has a negative refracting power. The lens elements of the optical imaging lens only include the first lens element to the sixth lens element and satisfy the following conditional expressions: $(T3+G34)/AAG \geq 1.400$ and $V5 \geq 45.000$, where T3 is a thickness of the third lens element along the optical axis, G34 is an air gap from the third lens element to the fourth lens element along the optical axis, AAG is a sum of five air gaps from the first lens element to the sixth lens element along the optical axis, and V5 is an Abbe number of the fifth lens element.

An embodiment of the present disclosure provides an optical imaging lens, which includes a first lens element, a second lens element, a third lens element, a fourth lens element, a fifth lens element, and a sixth lens element sequentially arranged from an object side to an image side along an optical axis. Each of the first lens element to the sixth lens element includes an object-side surface facing the object side and allowing imaging rays to pass through and an image-side surface facing the image side and allowing the imaging rays to pass through. An optical axis region of the image-side surface of the first lens element is convex. The second lens element has a negative refracting power. The fourth lens element has a negative refracting power. An optical axis region of the image-side surface of the fifth lens element is concave. The lens elements of the optical imaging lens only include the first lens element to the sixth lens element and satisfy the following conditional expressions: $(HFOV \times ImgH)/EFL \geq 50.000°$ and $V5 \geq 45.000$, where HFOV is a half field of view of the optical imaging lens, ImgH is an image height of the optical imaging lens, EFL is an effective focal length of the optical imaging lens, and V5 is an Abbe number of the fifth lens element.

Based on the above, the beneficial effects of the optical imaging lens according to the embodiments of the present disclosure are that the optical imaging lens can maintain a good imaging quality and provide a smaller front surface area of the lens under the case where the system length is shortened by satisfying the concave-convex surface design of the lens elements, the refracting power conditions, and the design of the conditional expressions.

To make the aforementioned and other features of the disclosure more comprehensible, several embodiments accompanied with drawings are described in detail as follows.

BRIEF DESCRIPTION OF THE DRAWINGS

FIG. 6 is a schematic view of an optical imaging lens according to the first embodiment of the present disclosure.

FIG. 7A to FIG. 7D are schematic views illustrating a longitudinal spherical aberration and various aberrations of the optical imaging lens according to the first embodiment.

FIG. 8 shows detailed optical data of the optical imaging lens according to the first embodiment of the present disclosure.

FIG. 9 shows aspheric parameters of the optical imaging lens according to the first embodiment of the present disclosure.

FIG. 10 is a schematic view of an optical imaging lens according to the second embodiment of the present disclosure.

FIG. 11A to FIG. 11D are schematic views illustrating a longitudinal spherical aberration and various aberrations of the optical imaging lens according to the second embodiment.

FIG. 12 shows detailed optical data of the optical imaging lens according to the second embodiment of the present disclosure.

FIG. 13 shows aspheric parameters of the optical imaging lens according to the second embodiment of the present disclosure.

FIG. 14 is a schematic diagram of an optical imaging lens according to the third embodiment of the present disclosure.

FIG. 15A to FIG. 15D are schematic views illustrating a longitudinal spherical aberration and various aberrations of the optical imaging lens according to the third embodiment.

FIG. 16 shows detailed optical data of the optical imaging lens according to the third embodiment of the present disclosure.

FIG. 17 shows aspherical parameters of the optical imaging lens according to the third embodiment of the present disclosure.

FIG. 20 shows detailed optical data of the optical imaging lens according to the fourth embodiment of the present disclosure.

FIG. 21 shows aspheric parameters of the optical imaging lens according to the fourth embodiment of the present disclosure.

FIG. 22 is a schematic view of an optical imaging lens according to the fifth embodiment of the present disclosure.

FIG. 23A to FIG. 23D are schematic views illustrating a longitudinal spherical aberration and various aberrations of the optical imaging lens according to the fifth embodiment.

FIG. 24 shows detailed optical data of the optical imaging lens according to the fifth embodiment of the present disclosure.

FIG. 25 shows aspherical parameters of the optical imaging lens according to the fifth embodiment of the present disclosure.

FIG. 28 shows detailed optical data of the optical imaging lens according to the sixth embodiment of the present disclosure.

FIG. 29 shows aspheric parameters of the optical imaging lens according to the sixth embodiment of the present disclosure.

FIG. 30 and FIG. 31 show various important parameters and values of conditional expressions thereof of the optical imaging lens according to the first to the sixth embodiments of the present disclosure.

DETAILED DESCRIPTION OF DISCLOSED EMBODIMENTS

The terms "optical axis region", "periphery region", "concave", and "convex" used in this specification and claims should be interpreted based on the definition listed in the specification by the principle of lexicographer.

Figure 1:
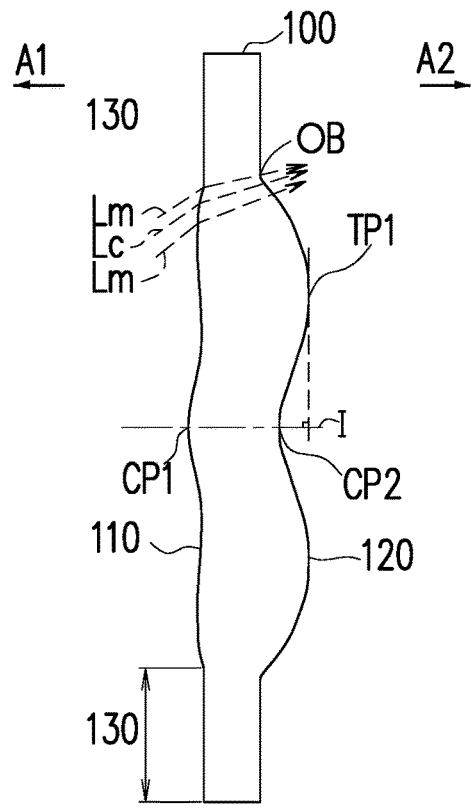
FIG. 1 is a schematic view illustrating a surface structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
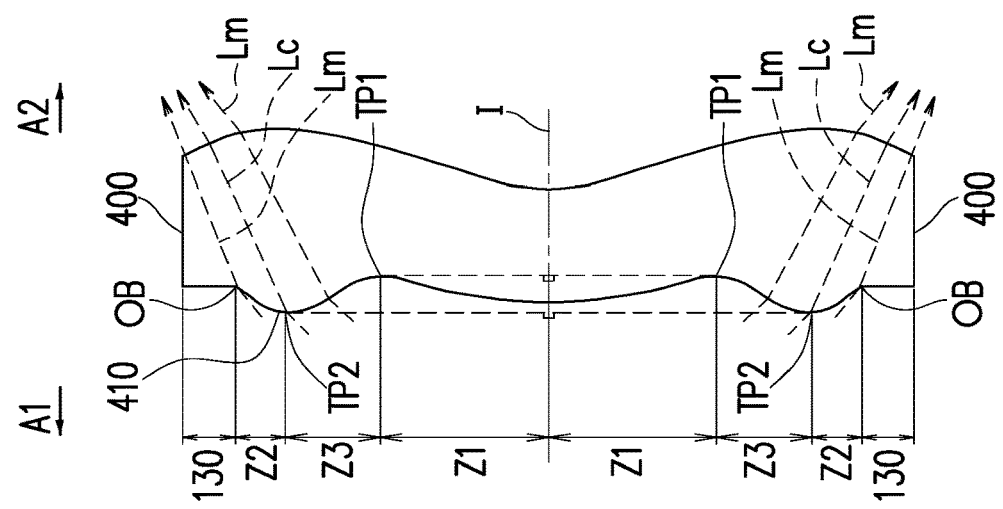
FIG. 4 is a schematic view illustrating a surface structure of a lens element according to the second example.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
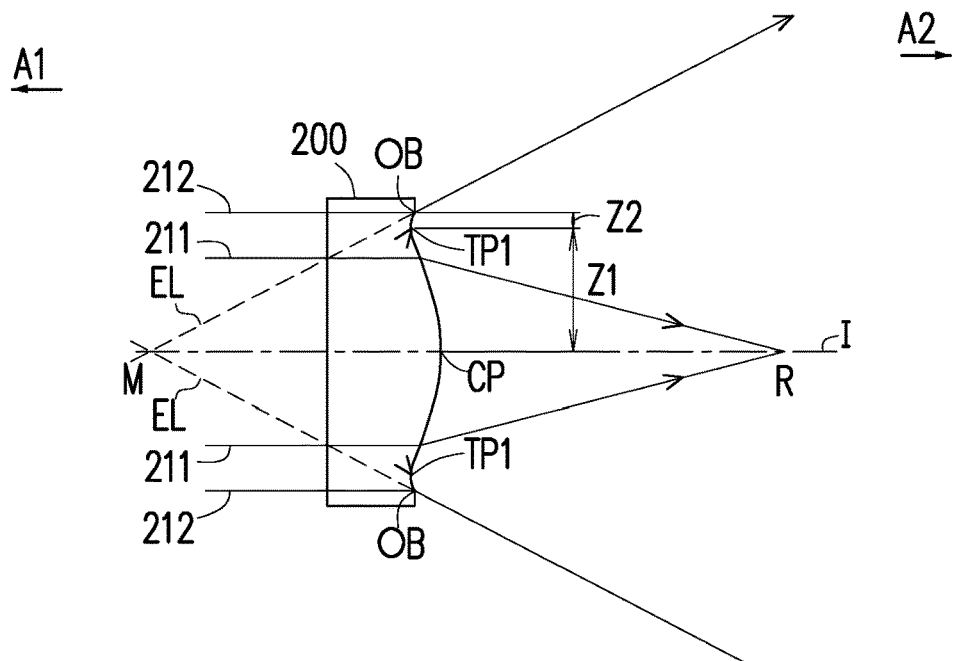
FIG. 2 is a schematic view illustrating a surface concave-convex structure of a lens element and a focal point of rays.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 3:
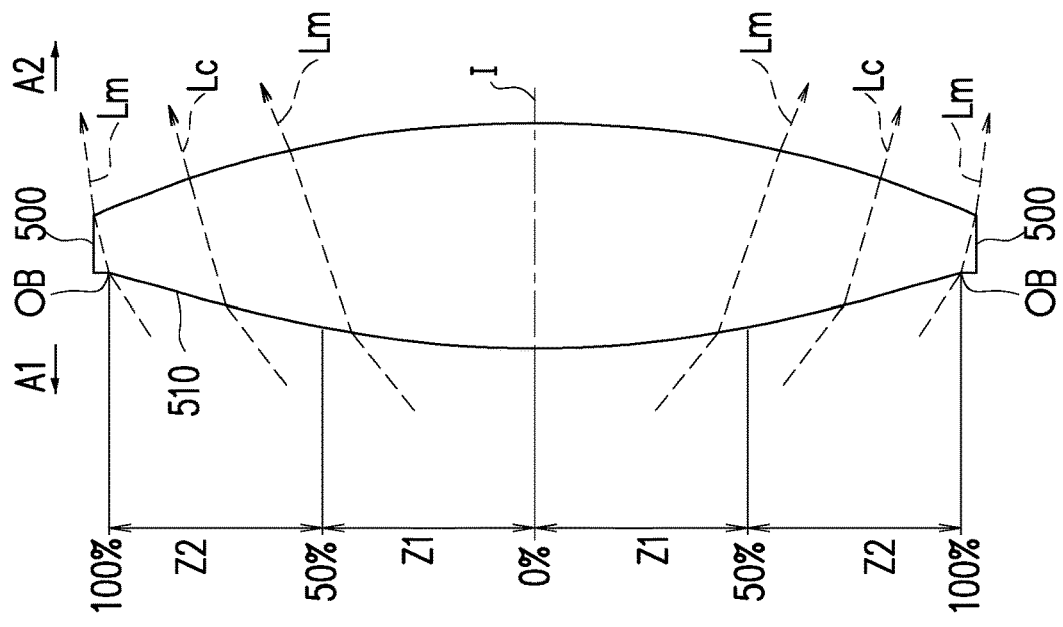
FIG. 3 is a schematic view illustrating a surface structure of a lens element according to the first example.
Figure 5:
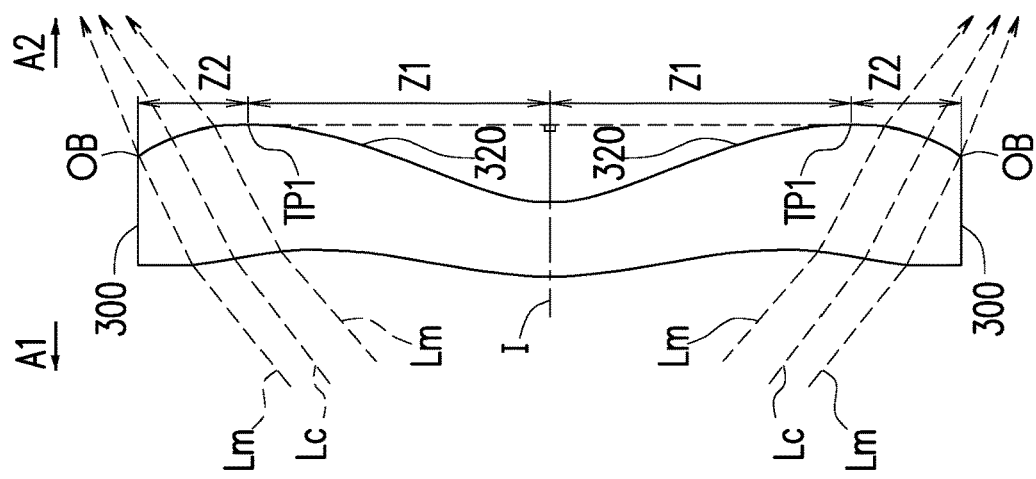
FIG. 5 is a schematic view illustrating a surface structure of a lens element according to the third example.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic view of an optical imaging lens according to the first embodiment of the present disclosure. FIG. 7A to FIG. 7D are schematic views illustrating a longitudinal spherical aberration and various aberrations of the optical imaging lens according to the first embodiment. Please refer to FIG. 6 first. An optical imaging lens 10 according to the first embodiment of the present disclosure includes an aperture 0, a first lens element 1, a second lens element 2, a third lens element 3, a fourth lens element 4, a fifth lens element 5, a sixth lens element 6, and a filter 9 sequentially arranged from an object side A1 to an image side A2 along an optical axis I of the optical imaging lens 10. After the light emitted from an object enters the optical imaging lens 10 and passes through the aperture 0, the first lens element 1, the second lens element 2, the third lens element 3, the fourth lens element 4, the fifth lens element 5, the sixth lens element 6, and the filter 9, an image is formed on an image plane 99. The filter 9 is provided between an image-side surface 66 of the sixth lens element 6 and the image plane 99. It is added that the object side is the side facing the object and the image side is the side facing the image plane 99. In an embodiment, the filter 9 may be an infrared (IR) cut filter, but the present disclosure is not limited thereto.

In the embodiment, the first lens element 1, the second lens element 2, the third lens element 3, the fourth lens element 4, the fifth lens element 5, the sixth lens element 6, and the filter 9 of the optical imaging lens 10 respectively have object-side surfaces 15, 25, 35, 45, 55, 65, and 95 facing the object side and allowing imaging rays to pass through and image-side surfaces 16, 26, 36, 46, 56, 66, and 96 facing the image side and allowing the imaging rays to pass through. In the embodiment, the aperture 0 is placed between the object side A1 and the first lens element 1.

The first lens element 1 has a positive refracting power. The material of the first lens element 1 is plastic. An optical axis region 151 of the object-side surface 15 of the first lens element 1 is convex and a periphery region 153 thereof is convex. An optical axis region 161 of the image-side surface 16 of the first lens element 1 is convex and a periphery region 163 thereof is convex. In the embodiment, both the object-side surface 15 and the image-side surface 16 of the first lens element 1 are aspheric surfaces, but the disclosure is not limited thereto.

The second lens element 2 has a negative refracting power. The material of the second lens element 2 is plastic. An optical axis region 251 of the object-side surface 25 of the second lens element 2 is convex and a periphery region 253 thereof is concave. An optical axis region 261 of the image-side surface 26 of the second lens element 2 is concave and a periphery region 263 thereof is convex. In the embodiment, both the object-side surface 25 and the image-side surface 26 of the second lens element 2 are aspherical surfaces, but the disclosure is not limited thereto.

The third lens element 3 has a positive refracting power. The material of the third lens element 3 is plastic. An optical axis region 351 of the object-side surface 35 of the third lens element 3 is convex and a periphery region 353 thereof is concave. An optical axis region 361 of the image-side surface 36 of the third lens element 3 is convex and a periphery region 363 thereof is convex. In the embodiment, both the object-side surface 35 and the image-side surface 36 of the third lens element 3 are aspherical surfaces, but the disclosure is not limited thereto.

The fourth lens element 4 has a negative refracting power. The material of the fourth lens element 4 is plastic. An optical axis region 451 of the object-side surface 45 of the fourth lens element 4 is concave and a periphery region 453 thereof is concave. An optical axis region 461 of the image-side surface 46 of the fourth lens element 4 is convex and a periphery region 463 thereof is convex. In the embodiment, both the object-side surface 45 and the image-side surface 46 of the fourth lens element 4 are aspherical surfaces, but the disclosure is not limited thereto.

The fifth lens element 5 has a positive refracting power. The material of the fifth lens element 5 is plastic. An optical axis region 551 of the object-side surface 55 of the fifth lens element 5 is convex and a periphery region 553 thereof is concave. An optical axis region 561 of the image-side surface 56 of the fifth lens element 5 is concave and a periphery region 563 thereof is convex. In the embodiment, both the object-side surface 55 and the image-side surface 56 of the fifth lens element 5 are aspherical surfaces, but the disclosure is not limited thereto.

The sixth lens element 6 has a positive refracting power. The material of the sixth lens element 6 is plastic. An optical axis region 651 of the object-side surface 65 of the sixth lens element 6 is convex and a periphery region 653 thereof is concave. An optical axis region 661 of the image-side surface 66 of the sixth lens element 6 is concave and a periphery region 663 thereof is convex. In the embodiment, both the object-side surface 65 and the image-side surface 66 of the sixth lens element 6 are aspherical surfaces, but the disclosure is not limited thereto.

In the embodiment, the lens elements of the optical imaging lens 10 having refracting power only include the six lens elements above.

Other detailed optical data according to the first embodiment are shown in FIG. 8. An effective focal length (EFL) of the optical imaging lens 10 according to the first embodiment is 2.605 mm, a half field of view (HFOV) is 49.685°, an F-number (Fno) is 2.450, an system length is 4.250 mm, and an image height is 3.180 mm, wherein the effective length refers to the distance from the object-side surface 15 of the first lens element 1 to the image plane 99 along the optical axis I.

In addition, in the embodiment, there is a total of twelve surfaces, the object-side surfaces 15, 25, 35, 45, 55, and 65 and the image-side surfaces 16, 26, 36, 46, 56, and 66, of the first lens element 1, the second lens element 2, the third lens element 3, the fourth lens element 4, the fifth lens element 5, and the sixth lens element 6, which are all aspheric surfaces, wherein the object-side surfaces 15, 25, 35, 45, 55, and 65 and the image-side surfaces 16, 26, 36, 46, 56, and 66 are even aspheric surfaces. The aspheric surfaces are defined by the following equation:

$$Z(Y) = \frac{Y^2}{R} \left/ \left(1 + \sqrt{1-(1+K)\frac{Y^2}{R^2}}\right) + \sum_{i=1}^{n} a_{2i} \times Y^{2i} \right. \tag{1}$$

where
- R: the radius of the surface of the lens element near to the optical axis I;
- Z: the depth of the aspheric surface (the perpendicular distance between a point on the aspheric surface having a distance Y from the optical axis I and a tangent plane tangential to a vertex of the aspheric surface along the optical axis I);
- Y: the distance between a point on an aspheric curve and the optical axis I;
- K: a conic constant; and
- $a_{2i}$: the $2i^{th}$ aspheric coefficient.

The various aspheric coefficients from the object-side surface 15 of the first lens element 1 to the image-side surface 66 of the sixth lens element 6 in Equation (1) are shown in FIG. 9. The field number 15 in FIG. 9 indicates the aspheric coefficient of the object-side surface 15 of the first lens element 1, and so on. In the embodiment and the following embodiments, the $2^{th}$ aspheric coefficient $a_2$ is 0.

In addition, relationships between various important parameters of the optical imaging lens 10 according to the first embodiment are shown in FIG. 30 and FIG. 31.

wherein,
- EFL is the effective focal length of the optical imaging lens 10;
- HFOV is the half field of view of the optical imaging lens 10;
- Fno is the F-number of the optical imaging lens 10;
- ImgH is the image height of the optical imaging lens 10;
- T1 is the thickness of the first lens element 1 along the optical axis I;
- T2 is the thickness of the second lens element 2 along the optical axis I;
- T3 is the thickness of the third lens element 3 along the optical axis I;
- T4 is the thickness of the fourth lens element 4 along the optical axis I;
- T5 is the thickness of the fifth lens element 5 along the optical axis I;
- T6 is the thickness of the sixth lens element 6 along the optical axis I;
- G12 is the distance from the image-side surface 16 of the first lens element 1 to the object-side surface 25 of the second lens element 2 along the optical axis I, that is, an air gap from the first lens element 1 to the second lens element 2 along the optical axis I;
- G23 is the distance from the image-side surface 26 of the second lens element 2 to the object-side surface 35 of the third lens element 3 along the optical axis I, that is, an air gap from the second lens element 2 to the third lens element 3 along the optical axis I;
- G34 is the distance from the image-side surface 36 of the third lens element 3 to the object-side surface 45 of the fourth lens element 4 along the optical axis I, that is, an air gap from the third lens element 3 to the fourth lens element 4 along the optical axis I;
- G45 is the distance from the image-side surface 46 of the fourth lens element 4 to the object-side surface 55 of the fifth lens element 5 along the optical axis I, that is, an air gap from the fourth lens element 4 to the fifth lens element 5 along the optical axis I;
- G56 is the distance from the image-side surface 56 of the fifth lens element 5 to the object-side surface 65 of the sixth lens element 6 along the optical axis I, that is, an air gap from the fifth lens element 5 to the sixth lens element 6 along the optical axis I;
- G6F is the distance from the image-side surface 66 of the sixth lens element 6 to the object-side surface 95 of the filter 9 along the optical axis I, that is, an air gap from the sixth lens element 6 to the filter 9 along the optical axis I;
- TF is the thickness of the filter 9 along the optical axis I;
- GFP is the distance from the image-side surface 96 of the filter 9 to the image plane 99 along the optical axis I, that is, an air gap from the filter 9 to the image plane 99 along the optical axis I;
- TTL is the distance from the object-side surface 15 of the first lens element 1 to the image plane 99 along the optical axis I;
- BFL is the distance from the image-side surface 66 of the sixth lens element 6 to the image plane 99 along the optical axis I;
- AAG is the sum of the five air gaps from the first lens element 1 to the sixth lens element 6 along the optical axis I, that is, the sum of air gaps G12, G23, G34, G45, and G56;
- ALT is the sum of thicknesses of the six lens elements from the first lens element 1 to the sixth lens element 6 along the optical axis I, that is, the sum of thicknesses T1, T2, T3, T4, T5, and T6; and
- TL is the distance from the object-side surface 15 of the first lens element 1 to the image-side surface 66 of the sixth lens element 6 along the optical axis I.

In addition, it is further defined that:
- f1 is the focal length of the first lens element 1;
- f2 is the focal length of the second lens element 2;
- f3 is the focal length of the third lens element 3;
- f4 is the focal length of the fourth lens element 4;
- f5 is the focal length of the fifth lens element 5;
- f6 is the focal length of the sixth lens element 6;
- n1 is the refractive index of the first lens element 1;
- n2 is the refractive index of the second lens element 2;
- n3 is the refractive index of the third lens element 3;
- n4 is the refractive index of the fourth lens element 4;
- n5 is the refractive index of the fifth lens element 5;
- n6 is the refractive index of the sixth lens element 6;
- V1 is the Abbe number of the first lens element 1, and the Abbe number may also be referred to as the dispersion coefficient;
- V2 is the Abbe number of the second lens element 2;
- V3 is the Abbe number of the third lens element 3;
- V4 is the Abbe number of the fourth lens element 4;
- V5 is the Abbe number of the fifth lens element 5; and
- V6 is the Abbe number of the sixth lens element 6.

With further reference to FIG. 7A to FIG. 7D. The diagram of FIG. 7A illustrates the longitudinal spherical aberration according to the first embodiment. The diagrams of FIG. 7B and FIG. 7C respectively illustrate a field curvature aberration in a sagittal direction and a field curvature aberration in a tangential direction on the image plane 99 according to the first embodiment when the wavelengths are 470 nm, 555 nm, and 650 nm. The diagram of FIG. 7D illustrates a distortion aberration on the image plane 99 according to the first embodiment when the wavelengths are 470 nm, 555 nm, and 650 nm. The longitudinal spherical aberration according to the first embodiment is shown in FIG. 7A. The curves formed by each wavelength are very close to each other and are gathered in the middle, which indicates that the off-axis rays with different heights of each wavelength are concentrated near the imaging points. It can be seen from the deviation amplitude of the curve of each wavelength that the deviation of the imaging points of the off-axis rays with different heights is controlled within the range of ±0.018 mm, so the first embodiment does significantly improve the spherical aberration of the same wavelength. In addition, the distances between the three representative wavelengths are also very close, which represents that the imaging positions of rays with different wavelengths are rather concentrated, so the chromatic aberration is also significantly improved.

In the two field curvature aberration diagrams of FIG. 7B and FIG. 7C, the variation of the focal lengths of the three representative wavelengths within the entire field of view fall within ±0.04 mm, which indicates that the optical system according to the first embodiment can effectively eliminate aberration. The distortion aberration diagram of FIG. 7D shows that the distortion aberration according to the first embodiment is maintained within a range of ±3.5%, which indicates that the distortion aberration according to the first embodiment has met the imaging quality requirements of the optical system. As such, compared with the conventional optical lenses, the first embodiment can still provide a good imaging quality under the condition that the system length has been shortened to about 4.250 mm. Therefore, the first embodiment can shorten the lens length and have a good optical quality under the condition of maintaining a good optical performance. In addition, the first embodiment also implements the target of having a smaller front surface area of the lens element.

FIG. 10 is a schematic view of an optical imaging lens according to the second embodiment of the present disclosure. FIG. 11A to FIG. 11D are schematic views illustrating a longitudinal spherical aberration and various aberrations of the optical imaging lens according to the second embodiment. Please refer to FIG. 10 first. The optical imaging lens 10 according to the second embodiment of the present disclosure is substantially similar to the first embodiment, and the differences between the two are as follows: the Abbe number of the fifth lens element 5 is different (an Abbe number V5 of the fifth lens element 5 according to the second embodiment is 55.987 and the Abbe number V5 of the fifth lens element 5 according to the first embodiment is 45.781), and various optical data, aspheric coefficients, and parameters between the lens elements 1, 2, 3, 4, 5, and 6 are more or less different. In addition, in the embodiment, a peripheral region 353 of an object-side surface 35 of the third lens element 3 is convex. A peripheral area 463 of an image-side surface 46 of the fourth lens element 4 is concave. It should be noted here that, in order to clearly show the drawing, FIG. 10 omits some of the reference numerals of the optical axis region and the periphery region similar to the first embodiment.

The detailed optical data of the optical imaging lens 10 according to the second embodiment is shown in FIG. 12. The effective focal length of the optical imaging lens 10 according to the second embodiment is 2.605 mm, the HFOV is 47.800°, the Fno is 2.450, the system length is 4.113 mm, and the image height is 2.961 mm.

FIG. 13 shows the aspherical coefficients in Equation (1) from the object-side surface 15 of the first lens element 1 to the image-side surface 66 of the sixth lens element 6 according to the second embodiment.

In addition, relationships between various important parameters in the optical imaging lens 10 according to the second embodiment are shown in FIG. 30 and FIG. 31.

The longitudinal spherical aberration according to the second embodiment is shown in FIG. 11A and the deviation of the imaging points of the off-axis rays with different heights is controlled within a range of ±0.025 mm. In the two field curvature aberration diagrams of FIG. 11B and FIG. 11C, the variation of the focal lengths of the three representative wavelengths within the entire field of view falls within ±0.045 mm. The distortion aberration diagram of FIG. 11D shows that the distortion aberration according to the second embodiment is maintained within a range of ±2.5%.

It can be known from the descriptions above that the system length according to the second embodiment is shorter than the first embodiment. In addition, the distortion aberration according to the second embodiment is better than the first embodiment.

FIG. 14 is a schematic view of the optical imaging lens according to the third embodiment of the present disclosure. FIG. 15A to FIG. 15D are schematic views illustrating a longitudinal spherical aberration and various aberrations of the optical imaging lens according to the third embodiment. Please refer to FIG. 14 first. The optical imaging lens 10 according to the third embodiment of the present disclosure is substantially similar to the first embodiment, and the differences between the two are as follows: the Abbe number of the fifth lens element 5 is different (an Abbe number V5 of the fifth lens element 5 according to the fifth embodiment is 55.987 and the Abbe number V5 of the fifth lens element 5 according to the first embodiment is 45.781), and various optical data, aspheric coefficients, and parameters between the lenses elements 1, 2, 3, 4, 5, and 6 are more or less different. It should be noted here that, in order to clearly show the drawing, FIG. 14 omits some of the reference numerals of the optical axis region and the periphery region similar to the first embodiment.

The detailed optical data of the optical imaging lens 10 according to the third embodiment is shown in FIG. 16. The effective focal length of the optical imaging lens 10 according to the third embodiment is 2.770 mm, the HFOV is 49.000°, the Fno is 2.450, the system length is 5.057 mm, and the image height is 3.104 mm.

FIG. 17 shows the aspherical coefficients in Equation (1) from the object-side surface 15 of the first lens element 1 to the image-side surface 66 of the sixth lens element 6 according to the third embodiment.

In addition, relationships between various important parameters in the optical imaging lens 10 according to the third embodiment are shown in FIG. 30 and FIG. 31.

The longitudinal spherical aberration according to the third embodiment is shown in FIG. 15A and the deviation of the imaging points of the off-axis rays with different heights is controlled within a range of ±0.03 mm. In the two field curvature aberration diagrams of FIG. 15B and FIG. 15C, the variation of the focal lengths of the three representative wavelengths within the entire field of view falls within ±0.7 mm. The distortion aberration diagram of FIG. 15D shows that the distortion aberration according to the third embodiment is maintained within a range of ±3.5%.

The manufacturing yield according to the third embodiment is better than the first embodiment.

Figure 18:
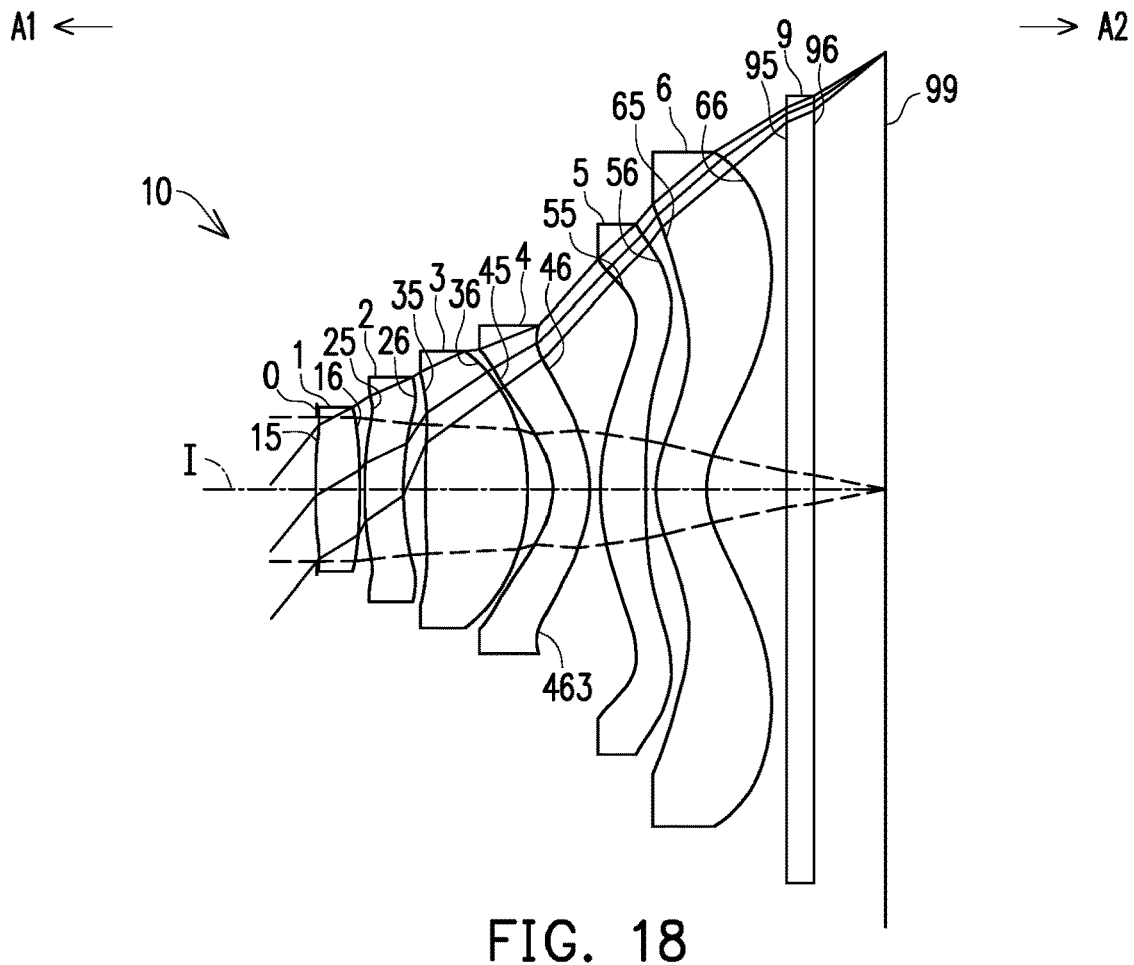
FIG. 18 is a schematic diagram of an optical imaging lens according to the fourth embodiment of the present disclosure.

FIG. 18 is a schematic view of the optical imaging lens according to the fourth embodiment of the present disclosure. FIG. 19A to FIG. 19D are schematic views illustrating a longitudinal spherical aberration and various aberrations of the optical imaging lens according to the fourth embodiment. Please refer to FIG. 18 first. The optical imaging lens 10 according to the fourth embodiment of the present disclosure is substantially similar to the first embodiment, and the differences between the two are as follows: the Abbe number of the fifth lens element 5 is different (an Abbe number V5 of the fifth lens element 5 according to the fifth embodiment is 55.987 and the Abbe number V5 of the fifth lens element 5 according to the first embodiment is 45.781), and various optical data, aspheric coefficients, and parameters between the lens elements 1, 2, 3, 4, 5, and 6 are more or less different. In addition, in the embodiment, a periphery region 463 of an image-side surface 46 of the fourth lens element 4 is concave. The sixth lens element 6 has a negative refracting power. It should be noted here that, in order to clearly show the drawing, FIG. 18 omits some of the reference numerals of the optical axis region and the periphery region similar to the first embodiment.

The detailed optical data of the optical imaging lens 10 according to the fourth embodiment is shown in FIG. 20. The effective focal length of the optical imaging lens 10 according to the fourth embodiment is 2.709 mm, the HFOV is 50.916°, the Fno is 2.450, the system length is 4.293 mm, and the image height is 3.321 mm.

FIG. 21 shows the aspherical coefficients in Equation (1) from the object-side surface 15 of the first lens element 1 to the image-side surface 66 of the sixth lens element 6 according to the fourth embodiment.

In addition, relationships between various important parameters in the optical imaging lens 10 according to the fourth embodiment are shown in FIG. 30 and FIG. 31.

Figures 19A, 19B, 19C, 19D:
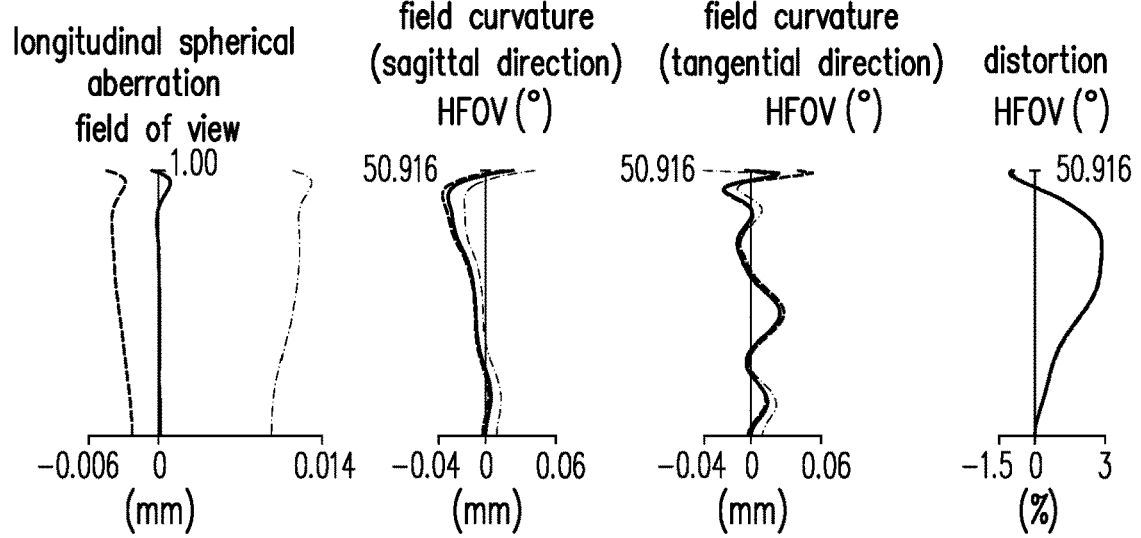
FIG. 19A to FIG. 19D are schematic views illustrating a longitudinal spherical aberration and various aberrations of the optical imaging lens according to the fourth embodiment.

The longitudinal spherical aberration according to the fourth embodiment is shown in FIG. 19A and the deviation of the imaging points of the off-axis rays with different heights is controlled within a range of ±0.014 mm. In the two field curvature aberration diagrams of FIG. 19B and FIG. 19C, the variation of the focal lengths of the three representative wavelengths within the entire field of view fall within ±0.06 mm. The distortion aberration diagram in FIG. 19D shows that the distortion aberration according to the fourth embodiment is maintained within a range of ±3%.

It can be known from the descriptions above that the longitudinal spherical aberration according to the fourth embodiment is better than the first embodiment. Moreover, the distortion aberration according to the fourth embodiment is better than the first embodiment.

FIG. 22 is a schematic view of the optical imaging lens according to the fifth embodiment of the present disclosure. FIG. 23A to FIG. 23D are schematic views illustrating a longitudinal spherical aberration and various aberrations of the optical imaging lens according to the fifth embodiment. Please refer to FIG. 22 first. The optical imaging lens 10 according to the fifth embodiment of the present disclosure is substantially similar to the first embodiment, and the differences between the two are as follows: the Abbe number of the fifth lens element 5 is different (an Abbe number V5 of the fifth lens element 5 according to the fifth embodiment is 55.987 and the Abbe number V5 of the fifth lens element 5 according to the first embodiment is 45.781), and various optical data, aspheric coefficients, and parameters between the lens elements 1, 2, 3, 4, 5, and 6 are more or less different. In addition, in the embodiment, a periphery region 463 of an image-side surface 46 of the fourth lens element 4 is concave. It should be noted here that, in order to clearly show the drawing, FIG. 22 omits some of the reference numerals of the optical axis region and the periphery region similar to the first embodiment.

The detailed optical data of the optical imaging lens 10 according to the fifth embodiment is shown in FIG. 24 and the effective focal length of the optical imaging lens 10 according to the fifth embodiment is 2.757 mm, the HFOV is 50.916°, the Fno is 2.450, the system length is 4.301 mm, and the image height is 3.321 mm.

FIG. 25 shows the aspherical coefficients in Equation (1) from the object-side surface 15 of the first lens element 1 to the image-side surface 66 of the sixth lens element 6 according to the fifth embodiment.

In addition, relationships between various important parameters in the optical imaging lens 10 according to the fifth embodiment are shown in FIG. 30 and FIG. 31.

The longitudinal spherical aberration according to the fifth embodiment is shown in FIG. 23A and the deviation of the imaging points of the off-axis rays with different heights is controlled within a range of ±0.025 mm. In the two field curvature aberration diagrams of FIG. 23B and FIG. 23C, the variation of the focal lengths of the three representative wavelengths within the entire field of view falls within ±0.12 mm. The distortion aberration diagram of FIG. 23D shows that the distortion aberration according to the fifth embodiment is maintained within a range of ±3%.

It can be known from the descriptions above that the distortion aberration according to the fifth embodiment is better than the first embodiment.

Figure 26:
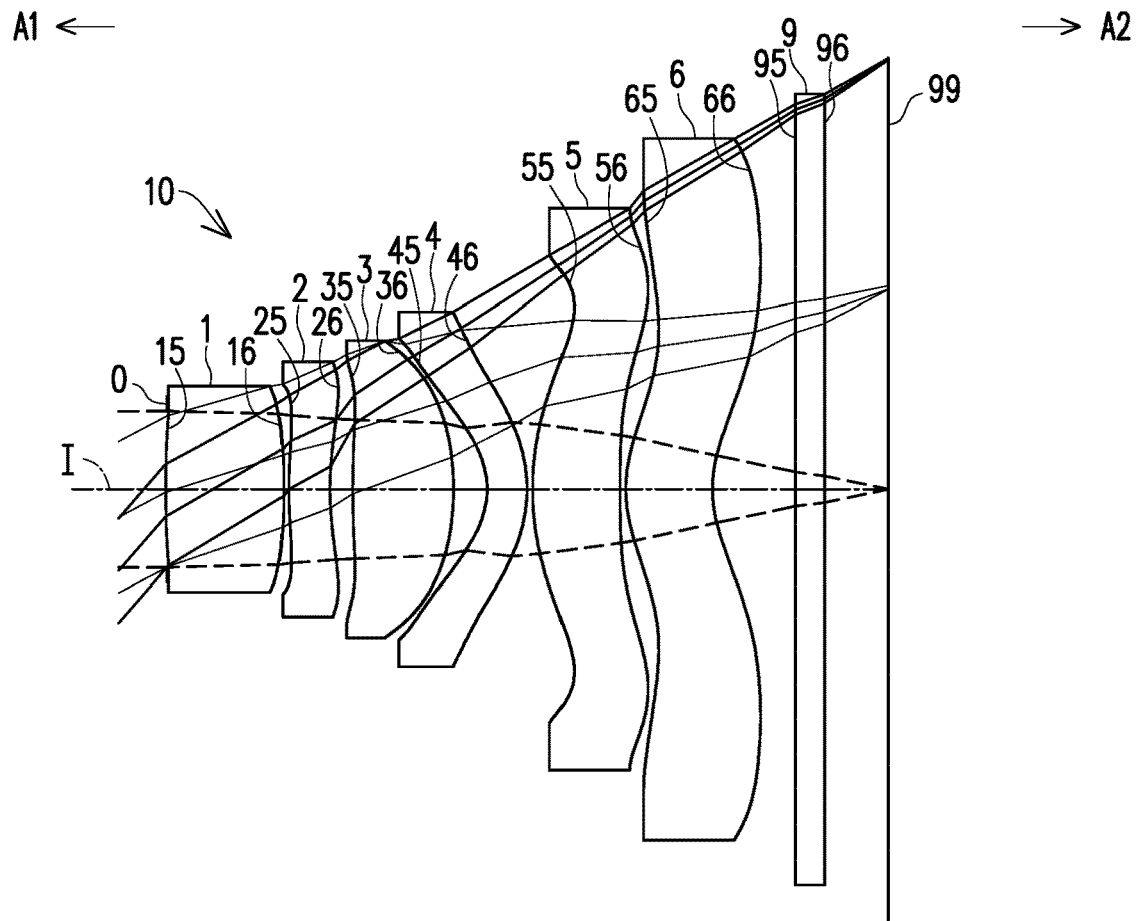
FIG. 26 is a schematic view of an optical imaging lens according to the sixth embodiment of the present disclosure.

FIG. 26 is a schematic view of the optical imaging lens according to the sixth embodiment of the present disclosure. FIG. 27A to FIG. 27D are schematic views illustrating a longitudinal spherical aberration and various aberrations of the optical imaging lens according to the sixth embodiment. Please refer to FIG. 26 first. The optical imaging lens 10 according to the sixth embodiment of the present disclosure is substantially similar to the first embodiment, and the differences between the two are as follows: the Abbe number of the fifth lens element 5 is different (an Abbe number V5 of the fifth lens element 5 according to the fifth embodiment is 55.987 and the Abbe number V5 of the fifth lens element 5 according to the first embodiment is 45.781), and various optical data, aspheric coefficients, and parameters between the lens elements 1, 2, 3, 4, 5, and 6 are more or less different. It should be noted here that, in order to clearly show the drawing, FIG. 26 omits some of the reference numerals of the optical axis region and the periphery region similar to the first embodiment.

The detailed optical data of the optical imaging lens 10 according to the sixth embodiment is shown in FIG. 28. The effective focal length of the optical imaging lens 10 according to the sixth embodiment is 2.768 mm, the HFOV is 49.000°, the Fno is 2.450, the effective length is 5.210 mm, and the image height is 3.103 mm.

FIG. 29 shows the aspherical coefficients in Equation (1) from the object-side surface 15 of the first lens element 1 to the image-side surface 66 of the sixth lens element 6 according to the sixth embodiment.

In addition, relationships between various important parameters in the optical imaging lens 10 according to the sixth embodiment are shown in FIG. 30 and FIG. 31.

Figures 27A, 27B, 27C, 27D:
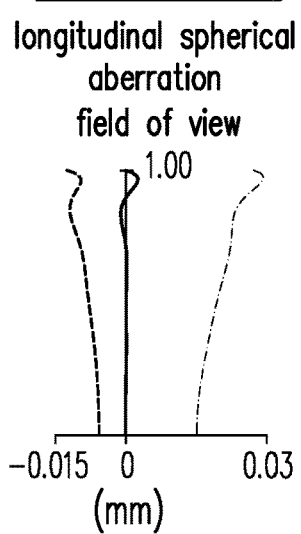
FIG. 27A to FIG. 27D are schematic views illustrating a longitudinal spherical aberration and various aberrations of the optical imaging lens according to the sixth embodiment.

The longitudinal spherical aberration according to the sixth embodiment is shown in FIG. 27A and the deviation of the imaging points of the off-axis rays with different heights is controlled within a range of ±0.03 mm. In the two field curvature aberration diagrams of FIG. 27B and FIG. 27C, the variation of the focal lengths of the three representative wavelengths within the entire field of view falls within ±0.45 mm. The distortion aberration diagram of FIG. 27D shows that the distortion aberration according to the sixth embodiment is maintained within a range of ±3.5%.

It can be known from the descriptions above that the manufacturing yield according to the sixth embodiment is better than the first embodiment.

With further reference to FIG. 30 and FIG. 31. FIG. 30 and FIG. 31 are tables of various optical parameters according to the first embodiment to the sixth embodiment.

In order to shorten the effective focal lengths of the lens elements, the air gaps between the lens elements or the thicknesses of the lens elements may be appropriately adjusted. However, the level of difficulty of production must be considered while ensuring the imaging quality. Therefore, the optical imaging lens 10 according to the embodiments of the present disclosure is able to have a better configuration when the numerical limitations of the following conditional expressions are satisfied.

In the optical imaging lens 10 according to the embodiment of the present disclosure, the following conditional expression is satisfied: ALT/(T4+G56)≥5.800, where the preferred range is 5.800≤ALT/(T4+G56)≤10.500.

In the optical imaging lens 10 according to the embodiment of the present disclosure, the following conditional expression is further satisfied: (T6+ImgH)/AAG≥5.900, where the preferred range is 5.900≤(T6+ImgH)/AAG≤7.500.

In the optical imaging lens 10 according to the embodiment of the present disclosure, the following conditional expression is further satisfied: HFOV/(EFL+TTL)≥5.700°/mm, where the preferred range is 5.700°/mm≤HFOV/(EFL+TTL)≤7.500°/mm.

In the optical imaging lens 10 according to the embodiment of the present disclosure, the following conditional expression is further satisfied: BFL/T6≤3.500, where the preferred range is 2.000≤BFL/T6≤3.500.

In the optical imaging lens 10 according to the embodiment of the present disclosure, the following conditional expression is further satisfied: TL/(G45+T5+G56)≥4.800, where the preferred range is 4.800≤TL/(G45+T5+G56)≤6.000.

In the optical imaging lens 10 according to the embodiment of the present disclosure, the following conditional expression is further satisfied: (T1+T3)/(G23+G34)≥2.100, where the preferred range is 2.100≤(T1+T3)/(G23+G34)≤4.000.

In the optical imaging lens 10 according to the embodiment of the present disclosure, the following conditional expression is further satisfied: (G12+T2+G45+T5)/T6≤2.200, where the preferred range is 1.300≤(G12+T2+G45+T5)/T6≤2.200.

In the optical imaging lens 10 according to the embodiment of the present disclosure, the following conditional expression is further satisfied: (T2+AAG)/T5≤2.500, where the preferred range is 1.000≤(T2+AAG)/T5≤2.500.

In the optical imaging lens 10 according to the embodiment of the present disclosure, the following conditional expression is further satisfied: TL/(T1+G34+T6)≤3.300, where the preferred range is 2.000≤TL/(T1+G34+T6)≤3.300.

In the optical imaging lens 10 according to the embodiment of the present disclosure, the following conditional expression is further satisfied: EFL/(T3+T4)≤3.700, where the preferred range is 2.400≤EFL/(T3+T4)≤3.700.

In the optical imaging lens 10 according to the embodiment of the present disclosure, the following conditional expression is further satisfied: TTL/ImgH≤1.800, where the preferred range is 1.100≤TTL/ImgH≤1.800.

In the optical imaging lens 10 according to the embodiment of the present disclosure, the following conditional expression is further satisfied: (T2+T4)/G34≤3.200, where the preferred range is 2.000≤(T2+T4)/G34≤3.200.

In the optical imaging lens 10 according to the embodiment of the present disclosure, the following conditional expression is further satisfied: ALT/(G34+G45+G56)≥7.000, where the preferred range is 7.000≤ALT/(G34+G45+G56)≤11.000.

In the optical imaging lens 10 according to the embodiment of the present disclosure, the following conditional expression is further satisfied: EFL/(G34+T6)≤4.800, where the preferred range is 3.000≤EFL/(G34+T6)≤4.800.

In the optical imaging lens 10 according to the embodiment of the present disclosure, the following conditional expression is further satisfied: (T1+T4+G45)/T2≤4.300, where the preferred range is 2.200≤(T1+T4+G45)/T2≤4.300.

In the optical imaging lens 10 according to the embodiment of the present disclosure, the following conditional expression is further satisfied: (G56+BFL)/T5≤4.200, where the preferred range is 2.000≤(G56+BFL)/T5≤4.200.

In the optical imaging lens 10 according to the embodiment of the present disclosure, the following conditional expression is further satisfied: (T4+T5+T6)/T3≤2.800, where the preferred range is 1.200≤(T4+T5+T6)/T3≤2.800.

In addition, any combination of the parameters of the embodiments may be selected to increase the limitation of the lens elements to facilitate the design of the lens elements of the same configuration as the present disclosure. In view of the unpredictability of optical system design, under the configuration of the disclosure, the system length of the optical imaging lens according to the embodiments of the disclosure may be shortened, the usable aperture may be enlarged, and the imaging quality may be enhanced, or the assembly yield may be improved when the conditions above are satisfied, such that the issues of the prior art may be resolved.

The exemplary limiting expressions above may also be selectively combined and applied to the embodiments of the present disclosure, and are not limited thereto. When implementing of the present disclosure, in addition to the expressions above, detailed structures such as arrangements of convex and concave curved surfaces may be designed for a single lens element or universally for multiple lens elements to enhance the control of system performance and/or resolution. It should be noted that the details need to be selectively combined and applied to other embodiments of the present disclosure under the condition of no conflict.

In summary, the optical imaging lens 10 according to the embodiments of the present disclosure can achieve the following effects and advantages:

1. According to the embodiments of the disclosure, the longitudinal spherical aberration, astigmatism aberration, and distortion are all complied with usage specifications. In addition, the off-axis rays with different heights of the three, red, green, and blue, representative wavelengths all concentrate near the imaging points. It can be observed from the deviation amplitude of each curve that the deviation of the imaging points of the off-axis rays with different heights are under control, and the spherical aberration, astigmatism aberration, and distortion are suppressed properly. The imaging quality data further shows that the distances between the three, red, green, and blue, representative wavelengths are rather close, which indicates that the rays with different wavelengths are concentrated and dispersion is suppressed properly under various conditions. In summary, the disclosure can achieve an excellent imaging quality by the design and arrangement of the lens elements.

2. The design of convexity-concavity and refracting power of the lens according to the embodiments of the present disclosure are, for example, as follows. The optical axis region of the image-side surface of the first lens element is designed as convex, the second lens element has negative refracting power, the fourth lens element has negative refracting power, and the optical axis region of the image-side surface of the fifth lens element is designed as concave, which can effectively reduce the ratio of the lens to the screen surface area and achieve the objectives of correcting the spherical aberration, astigmatism aberration, and reducing the distortion of the optical system. Moreover, when the optical imaging lens satisfies: (T3+G34)/T4≥1.900, the system length of the optical imaging lens can also be effectively shortened, and when the optical imaging lens satisfies: (HFOV×ImgH)/EFL≥50.000°, the field of view (FOV) can be widened and the image height of the lens can be increased, where the preferred ranges are 1.900≤(T3+G34)/T4≤3.700 and 50.000°≤(HFOV×ImgH)/EFL≤65.000°.

3. The design of convexity-concavity and refracting power of the lens according to the embodiments of the present disclosure are, for example, as follows. The optical axis region of the image-side surface of the first lens element is designed as convex, the second lens has negative refracting power, the fourth lens has negative refracting power, and V5≥45.000, which can effectively reduce the ratio of the lens to the screen surface area and achieve the objectives of correcting the spherical aberration, chromatic aberration, astigmatism aberration, and reducing the distortion of the optical system, where the preferred range is 45.000≤V5≤65.000. Moreover, when the optical imaging lens satisfies: (T3+G34)/AAG≥1.400, the system length of the optical imaging lens can also be effectively shortened, where the preferred range is 1.400≤(T3+G34)/AAG≤2.000.

4. The design of convexity-concavity and refracting power of the lens according to the embodiments of the present disclosure are, for example, as follows. The optical axis region of the image-side surface of the first lens element is designed as convex, the second lens has negative refracting power, the fourth lens has negative refracting power, the optical axis region of the image-side surface of the fifth lens element is designed as concave, and V5≥45.000, which can effectively reduce the ratio of the lens to the screen surface area and achieve the objectives of correcting the spherical aberration, chromatic aberration, astigmatism aberration, and reducing the distortion of the optical system, where the preferred range is 45.000≤V5≤65.000. Moreover, when the optical imaging lens satisfies: (HFOV×ImgH)/EFL≥50.000°, the FOV can be widened and the image height of the lens can be increased, where the preferred range is 50.000°≤(HFOV×ImgH)/EFL≤65.000°.

5. The aspheric design of the lens elements according to the embodiments of the present disclosure facilitates optimization of the imaging quality.

6. The plastic material selected by the lens elements according to the embodiments of the present disclosure assists in weight reduction, thereby further reducing the weight and saving the cost of the optical imaging lens.

The numerical ranges including the maximum and minimum values obtained from the combined proportional relationship of the optical parameters disclosed by the embodiments of the present disclosure can be implemented accordingly.

Although the disclosure has been disclosed in the above embodiments, the embodiments are not intended to limit the disclosure. It will be apparent to persons skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens, comprising a first lens element, a second lens element, a third lens element, a fourth lens element, a fifth lens element, and a sixth lens element sequentially arranged from an object side to an image side along an optical axis, wherein each of the first lens element to the sixth lens element comprises an object-side surface facing the object side and allowing imaging rays to pass through and an image-side surface facing the image side and allowing the imaging rays to pass through, wherein the first lens element has a positive refracting power, and an optical axis region of the image-side surface of the first lens element is convex and has a negative radius;

the second lens element has a negative refracting power;

the third lens element has a positive refracting power;

the fourth lens element has a negative refracting power;

the fifth lens element has a positive refracting power;

an optical axis region of the image-side surface of the fifth lens element is concave; and lens elements of the optical imaging lens only comprise the first lens element to the sixth lens element and satisfy the following conditional expressions: (T3+G34)/T4≥1.900 and (HFOV×ImgH)/EFL≥50.000°, where T3 is a thickness of the third lens element along the optical axis, T4 is a thickness of the fourth lens element along the optical axis, G34 is an air gap from the third lens element to the fourth lens element along the optical axis, HFOV is a half field of view of the optical imaging lens, ImgH is an image height of the optical imaging lens, and EFL is an effective focal length of the optical imaging lens.

2. The optical imaging lens according to claim 1, wherein the optical imaging lens further satisfies the following conditional expression: (T1+T3)/(G23+G34)≥2.100, where T1 is a thickness of the first lens element along the optical axis and G23 is an air gap from the second lens element to the third lens element along the optical axis.

3. The optical imaging lens according to claim 1, wherein the optical imaging lens further satisfies the following conditional expression: TL/(T1+G34+T6)≤3.300, where TL is a distance from the object-side surface of the first lens element to the image-side surface of the sixth lens element along the optical axis, T1 is a thickness of the first lens element along the optical axis, and T6 is a thickness of the sixth lens element along the optical axis.

4. The optical imaging lens according to claim 1, wherein the optical imaging lens further satisfies the following conditional expression: ALT/(G34+G45+G56)≥7.000, where ALT is a sum of thicknesses of six lens elements from the first lens element to the sixth lens element along the optical axis, G45 is an air gap from the fourth lens element to the fifth lens element along the optical axis, and G56 is an air gap from the fifth lens element to the sixth lens element along the optical axis.

5. The optical imaging lens according to claim 1, wherein the optical imaging lens further satisfies the following conditional expression: BFL/T6≤3.500, where BFL is a distance from the image-side surface of the sixth lens element to an image plane along the optical axis and T6 is a thickness of the sixth lens element along the optical axis.

6. The optical imaging lens according to claim 1, wherein the optical imaging lens further satisfies the following conditional expression: TL/(G45+T5+G56)≥4.800, where TL is a distance from the object-side surface of the first lens element to the image-side surface of the sixth lens element along the optical axis, G45 is an air gap from the fourth lens element to the fifth lens element along the optical axis, G56 is an air gap from the fifth lens element to the sixth lens element along the optical axis, and T5 is a thickness of the fifth lens element along the optical axis.

7. The optical imaging lens according to claim 1, wherein the optical imaging lens satisfies the following conditional expression: (G12+T2+G45+T5)/T6≤2.200, where G12 is an air gap from the first lens element to the second lens element along the optical axis, G45 is an air gap from the fourth lens element to the fifth lens element along the optical axis, T2 is a thickness of the second lens element along the optical axis, T5 is a thickness of the fifth lens element along the optical axis, and T6 is a thickness of the sixth lens along the optical axis.

8. An optical imaging lens, comprising a first lens element, a second lens element, a third lens element, a fourth lens element, a fifth lens element, and a sixth lens element sequentially arranged from an object side to an image side along an optical axis, wherein each of the first lens element to the sixth lens element comprises an object-side surface facing the object side and allowing imaging rays to pass through and an image-side surface facing the image side and allowing the imaging rays to pass through, wherein the first lens element has a positive refracting power, and an optical axis region of the image-side surface of the first lens element is convex and has a negative radius;
the second lens element has a negative refracting power;
the third lens element has a positive refracting power;
the fourth lens element has a negative refracting power;
the fifth lens element has a positive refracting power; and
lens elements of the optical imaging lens only comprise the first lens element to the sixth lens element and satisfy the following conditional expressions: (T3+G34)/AAG≥1.400 and V5≥45.000, where T3 is a thickness of the third lens element along the optical axis, G34 is an air gap from the third lens element to the fourth lens element along the optical axis, AAG is a sum of five air gaps from the first lens element to the sixth lens element along the optical axis, and V5 is an Abbe number of the fifth lens element.

9. The optical imaging lens according to claim 8, wherein the optical imaging lens further satisfies the following conditional expression: (G56+BFL)/T5≤4.200, where G56 is an air gap from the fifth lens element to the sixth lens element along the optical axis, BFL is a distance from the image-side surface of the sixth lens element to an image plane along the optical axis, and T5 is a thickness of the fifth lens element along the optical axis.

10. The optical imaging lens according to claim 8, wherein the optical imaging lens further satisfies the following conditional expression: (T6+ImgH)/AAG≥5.900, where T6 is a thickness of the sixth lens element along the optical axis and ImgH is an image height of the optical imaging lens.

11. The optical imaging lens according to claim 8, wherein the optical imaging lens further satisfies the following conditional expression: HFOV/(EFL+TTL)≥5.700°/mm, where HFOV is a half field of view of the optical imaging lens, EFL is an effective focal length of the optical imaging lens, and TTL is a distance from the object-side surface of the first lens element to an image plane along the optical axis.

12. The optical imaging lens according to claim 8, wherein the optical imaging lens further satisfies the following conditional expression: (T2+AAG)/T5≤2.500, where T2 is a thickness of the second lens element along the optical axis and T5 is a thickness of the fifth lens element along the optical axis.

13. The optical imaging lens according to claim 8, wherein the optical imaging lens further satisfies the following conditional expression: TTL/ImgH≤1.800, where TTL is a distance from the object-side surface of the first lens element to an image plane along the optical axis and ImgH is an image height of the optical imaging lens.

14. The optical imaging lens according to claim 8, wherein the optical imaging lens further satisfies the following conditional expression: ALT/(T4+G56)≥5.800, where ALT is a sum of thicknesses of six lens elements from the first lens element to the sixth lens element along the optical axis, T4 is a thickness of the fourth lens element along the optical axis, and G56 is an air gap from the fifth lens element to the sixth lens element along the optical axis.

15. An optical imaging lens, comprising a first lens element, a second lens element, a third lens element, a fourth lens element, a fifth lens element, and a sixth lens element sequentially arranged from an object side to an image side along an optical axis, wherein each of the first lens element to the sixth lens element comprises an object-side surface facing the object side and allowing imaging rays to pass through and an image-side surface facing the image side and allowing the imaging rays to pass through, wherein the first lens element has a positive refracting power;
the second lens element has a negative refracting power;
the third lens element has a positive refracting power;
the fourth lens element has a negative refracting power;
the fifth lens element has a positive refracting power;
a periphery region of the object-side surface of the sixth lens element is concave; and
lens elements of the optical imaging lens only comprise the first lens element to the sixth lens element and satisfy the following conditional expressions: (HFOV×ImgH)/EFL≥50.000°, EFL/(G34+T6)≤4.800, (T2+AAG)/T5<2.500 and V5≥45.000, where HFOV is a half field of view of the optical imaging lens, ImgH is an image height of the optical imaging lens, EFL is an effective focal length of the optical imaging lens, G34 is an air gap from the third lens element to the fourth lens element along the optical axis, T2 is a thickness of the second lens element along the optical axis, T5 is a thickness of the fifth lens element along the optical axis, T6 is a thickness of the sixth lens element along the optical axis, AAG is a sum of five air gaps from the first lens element to the sixth lens element along the optical axis and V5 is an Abbe number of the fifth lens element.

16. The optical imaging lens according to claim 15, wherein the optical imaging lens further satisfies the following conditional expression: (T1+T4+G45)/T2≤4.300, where T1 is a thickness of the first lens element along the optical axis, T4 is a thickness of the fourth lens element along the optical axis, and G45 is an air gap from the fourth lens element to the fifth lens element along the optical axis.

17. The optical imaging lens according to claim 15, wherein the optical imaging lens further satisfies the following conditional expression: EFL/(T3+T4)≤3.700, wherein T3 is a thickness of the third lens element along the optical axis and T4 is a thickness of the fourth lens element along the optical axis.

18. The optical imaging lens according to claim 15, wherein the optical imaging lens further satisfies the following conditional expression: $(T2+T4)/G34 \leq 3.200$, where T4 is a thickness of the fourth lens element along the optical axis.

19. The optical imaging lens according to claim 15, wherein the optical imaging lens further satisfies the following conditional expression: $(T4+T5+T6)/T3 \leq 2.800$, where T3 is a thickness of the third lens element along the optical axis, and T4 is a thickness of the fourth lens element along the optical axis.

* * * * *